(12) United States Patent
O'Riordan

(10) Patent No.: US 9,182,948 B1
(45) Date of Patent: Nov. 10, 2015

(54) METHOD AND SYSTEM FOR NAVIGATING HIERARCHICAL LEVELS USING GRAPHICAL PREVIEWS

(75) Inventor: Donald J. O'Riordan, Sunnyvale, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 1126 days.

(21) Appl. No.: 12/756,867

(22) Filed: Apr. 8, 2010

(51) Int. Cl.
 G06F 3/048 (2013.01)
 G06F 9/44 (2006.01)
 G05B 19/042 (2006.01)

(52) U.S. Cl.
 CPC .............. *G06F 8/34* (2013.01); *G05B 19/0426* (2013.01); *G06F 3/048* (2013.01)

(58) Field of Classification Search
 CPC ..... G06F 3/0481; G06F 3/0484; G06F 3/048; G06F 2217/74; G01R 19/28; G05B 2219/23291; F24F 11/0086; Y10S 715/964
 USPC ........................................................ 715/711
 See application file for complete search history.

(56) References Cited

U.S. PATENT DOCUMENTS

| | | | | |
|---|---|---|---|---|
| 4,970,664 | A * | 11/1990 | Kaiser et al. ................... | 715/804 |
| 6,983,227 | B1 * | 1/2006 | Thalhammer-Reyero ........ | 703/2 |
| 7,139,819 | B1 * | 11/2006 | Luo et al. ....................... | 709/223 |
| 7,499,045 | B2 * | 3/2009 | Itoh et al. ...................... | 345/418 |
| 7,865,857 | B1 | 1/2011 | Chopra et al. | |
| 2002/0101431 | A1 | 8/2002 | Forney et al. | |
| 2005/0004911 | A1 * | 1/2005 | Goldberg et al. ................. | 707/7 |
| 2005/0188339 | A1 | 8/2005 | Anderson | |
| 2007/0192695 | A1 * | 8/2007 | Grotjohn et al. ............... | 715/713 |
| 2007/0208840 | A1 * | 9/2007 | McConville et al. .......... | 709/223 |
| 2008/0019614 | A1 * | 1/2008 | Robertson et al. ............. | 382/305 |
| 2008/0077845 | A1 | 3/2008 | Cho et al. | |
| 2008/0127051 | A1 * | 5/2008 | Milligan ........................ | 717/105 |
| 2008/0282212 | A1 * | 11/2008 | Dennison et al. ............... | 716/10 |
| 2009/0216808 | A1 * | 8/2009 | Wallace ...................... | 707/104.1 |
| 2009/0327967 | A1 * | 12/2009 | Matsuda et al. ............... | 715/840 |
| 2011/0107320 | A1 | 5/2011 | Flisakowski et al. | |
| 2011/0145760 | A1 * | 6/2011 | Radet et al. ................... | 715/810 |
| 2011/0145772 | A1 | 6/2011 | Pikus | |
| 2011/0154243 | A1 * | 6/2011 | Styga et al. .................... | 715/771 |

OTHER PUBLICATIONS

Cadence Design Systems, Inc.,"Incisive Enterprise Simulator", Datasheet, 20423 Nov. 2007 MK/FLB/JA/PDF, 7 pages.
Turner, R., Cadence Design Systems, Inc., "Incisive Verification Newsletter", Sep. 2004, 21 pages.

* cited by examiner

*Primary Examiner* — Alvin Tan
*Assistant Examiner* — Ayesha Huertas Torres
(74) *Attorney, Agent, or Firm* — Sawyer Law Group, P.C.

(57) ABSTRACT

Navigating hierarchical levels of a design using graphical preview images. In one aspect, a method for providing a preview image for a design includes causing a display of a main image depicting a first portion of the design, the design organized into multiple hierarchical levels, each level having a different amount of abstraction of graphical information of the design. A preview image smaller than the main image is displayed, portraying a second portion of the design at a different hierarchical level than the first portion. The preview image is receptive to a selection causing the second portion to be displayed as the main image. Some embodiments allow the preview image to include one or more hotspots that cause a display of another preview image at a different hierarchical level, or to show a connected object connected to a probed first object.

27 Claims, 29 Drawing Sheets

METHOD AND SYSTEM FOR NAVIGATING HIERARCHICAL LEVELS USING GRAPHICAL PREVIEWS

FIELD OF THE INVENTION

The present invention relates to graphical display by computer systems, and more particularly to navigating graphical designs displayed by a computer system.

BACKGROUND OF THE INVENTION

Computer-enabled graphical editing systems are used in a wide variety of different applications and industries to view and edit different types of visual images on computer systems or other electronic devices. One common application is electronic design automation, including such applications as schematic design and layout design, in which the designs for components and spatial layout of electronic components such as integrated circuits and circuit boards are viewed, created and edited using displayed images.

Circuit designers use graphical display software to display, navigate, create and edit circuit schematics and layout designs. Since integrated circuit designs, and other types of designs, can be extremely large and complex, these designs are often decomposed into different hierarchical levels. Hierarchical decomposition has long been an aid in allowing a high level of complexity to be attained in designs. The highest level of the hierarchy may show an overall simplified view of the design including abstracted symbols or other markers representing more complex components of the design. To view details of a symbol, the hierarchy can be descended to the next level on that desired symbol, which may include components allowing a further descent to a lower level of the hierarchy, and so on.

Hierarchical decomposition, however, often leads to burdensome navigation operations for designers. Breaking designs into hierarchies comes at a cost of requiring users to later navigate those hierarchies when debugging designs or physically implementing designs in layout. For example, schematic hierarchy navigation operations have been found to occur almost as frequently as zoom and select operations.

Some graphical application software has included navigation selection features to support navigation of design hierarchical levels in general. For example, in an existing design application, a list of text labels is displayed in a separate window. The user can select any of the text labels to navigate to the corresponding cell, module, or hierarchical level. The software also displays a "Go" toolbar, which when selected displays a navigation history of cells or modules which have been previously displayed, from which the user can select to navigate to the selected cell or module.

However, these types of features can be awkward for users. One reason is that these functions require the user to move his or her attention, and the controlled cursor, away from the schematic canvas. This directs the user focus away from the canvas and creates delays in returning focus back to the canvas and the objects to viewed or edited. In addition, these functions identify different views or levels in a textual format. A user must read and parse these text names or hierarchical occurrence paths in order to determine which module or cell is which. For example, a list of design cells in an integrated circuit layout can be displayed, but design cells are often stored in the same library, and sub-cells are often given similar names to the parent cells which instantiate them. A user attempting to manually read and parse these path names will have a lot of reading and scanning from left to right in order to extract the most pertinent piece of information (which often appears at the end or right side of a text identifier, many characters into the text string). The user then has to recall and recognize those text strings and associate them with particular design cells, which is cumbersome. Further, designers often employ variants of any given design cell, and analog designers in particular often employ variants which are topologically quite different from one another. Such variants are not easily recognizable in the existing navigation selection features.

Graphical applications also typically include standard zoom and pan operations to allow a user to navigate within a design canvas to get to different levels of the design. However, this is awkward as well. For example, the higher-level schematic design symbols are often simple rectangles in shape, and it is often the case that a user has to substantially alter the zoom level in order to obtain additional information to determine if a given symbol instance is truly the one into which he wishes to descend. (Greater zoom magnification will cause a symbol to be displayed larger, but will not reveal the details of any lower level of the hierarchy.) Thus, the user may try to have the schematic drawn at a sufficiently low zoom level in order to make the text labels on the instances fully visible such that they can be read (and again mentally parsed), which often requires several zoom operations. Simultaneously, the user tries to combine the textual name with the symbol shape and layout to mentally associate the text labels with the desired underlying lower-level schematic diagram (which in practice is often quite different from the higher-level symbol shape).

Another issue is that such zoom, select, read, parse, and descend operations are often performed multiple times, particularly in schematics with multiple levels of hierarchy. For example, four or five levels deep is not uncommon, and in enormous designs (such as FPGAs) the number of hierarchical levels may easily exceed this. Users often navigate across several levels of hierarchy, e.g. when tracing a power net or the drivers or loads of a given signal, etc., thus repeating these operations many times. Some applications allow a user to probe signals. For example, one commercially available standalone graphical waveform viewer and netlist tracer allows a user to trace a given signal backwards or forwards along its fan-in/fan-out, listing text such a signal's name and driver/receiver, and allowing a user to select a driver or receiver to navigate to that main view and also synthesizing a schematic showing the signal of interest as it crosses hierarchical boundaries. However, programs such as this operate only in a textual manner, do not help the user visualize the hierarchical context of the signal connections, and do not leverage any existing schematic for schematic-based designs. Thus the existing features of graphical applications are inefficient and time-consuming when navigating multiple hierarchical levels of a design.

SUMMARY OF THE INVENTION

The inventions of the present application relate to navigating graphical designs displayed by a computer system. In one aspect of the invention, a method for providing a preview image for a design using a computer system includes causing a display of a main image depicting a first portion of the design on a display device, where the design is organized into multiple hierarchical levels, each level having a different amount of abstraction of graphical information of the design. The method causes a display of a preview image smaller than the main image, the preview image portraying a second portion of the design at a different hierarchical level of the design than the first portion of the design. The preview image is receptive to a selection of the preview image, which causes the second portion of the design to be displayed as the main image. A similar aspect is provided for a computer program product comprising a computer readable medium including program instructions for implementing similar features.

In another aspect, a system for displaying a preview image for a design using a computer system includes a processor causing a display of a main image depicting a first portion of the design on a display device, where the design is organized into hierarchical levels, each level having a different amount of abstraction of graphical information of the design. The processor causes a display of a preview image smaller than the main image on the display device, the preview image portraying a second portion of the design at a different hierarchical level of the design than the first portion of the design. The preview image is responsive to a selection of the preview image, causing the processor to display the second portion of the design as the main image.

The present inventions allow a user to work within a graphical interface to design, edit, and view a graphical design while reducing the number of hierarchical navigation operations required to perform viewing and editing tasks, thereby allowing the user to perform viewing and editing tasks with greater ease. The present inventions also allow such navigation operations to be performed within a graphical environment to more easily allow the designer to retain the context of the different levels of the design.

DETAILED DESCRIPTION

Figure 1:
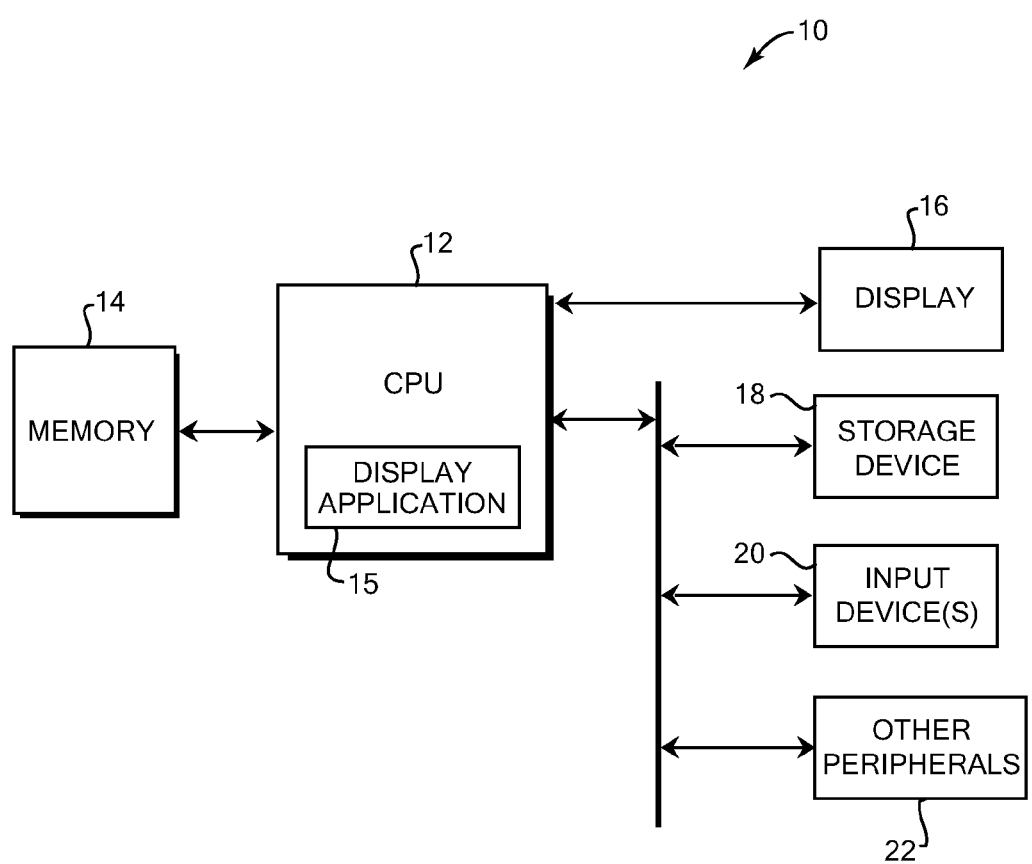
FIG. 1 is a block diagram illustrating a system suitable for use with the present invention.

The present inventions relate to graphical display by computer systems, and more particularly to navigating graphical designs displayed by a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular methods and systems provided in particular implementations. However, one of ordinary skill in the art will readily recognize that these methods and systems will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The inventions herein can take the form of a software embodiment, a hardware embodiment, or an embodiment containing both hardware and software elements. A software embodiment can include but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

The present inventions allow easier navigation operations within a graphical design by allowing users to view multiple hierarchical levels in a single interface screen. The present inventions include the display of preview images corresponding to a selected symbol in a displayed canvas image, thus facilitating a user in determining how to traverse a design hierarchy of the canvas image. Some embodiments further augment preview images with image hotspots in the preview image, which themselves provide additional navigation capabilities facilitating hierarchy traversal operations. Some embodiments also may include a corresponding graphical mechanism to facilitate navigation operations upward in the design hierarchy, equivalent to "return" operations in some schematic design applications. Some embodiments also may include a corresponding graphical mechanism to facilitate signal probing or signal flow and/or debug operations which cut across the design hierarchy.

To more particularly describe the features of the present invention, please refer to FIGS. 1-29 in conjunction with the discussion below.

FIG. 1 is a block diagram illustrating a system 10 suitable for use with the present inventions. System 10 can be any suitable computer system, server, or other electronic or hardware device. For example, the system 10 can be a mainframe computer, desktop computer, workstation, portable computer, or electronic device (set-top box, portable device, cell phone, personal digital assistant, media player, game device, etc.). System 10 includes a CPU 12, memory 14, display device 16, storage device 18, input device(s) 20, and other peripherals 22.

CPU 12 can be one or more microprocessors or other processors to execute program code and control basic operations of the system 10, including processing operations, manipulating data, issuing commands to other components of the system 10, etc. For example, an operating system can run on the system 10 and is implemented by the microprocessor 20 and other components of the system 10. CPU 12 can also implement graphical editing software application 15 of the present invention, as described further below.

Memory 14 is typically provided in system 10 for access by the CPU 12, and can include one or more of a variety of types, such as random access memory (RAM), read-only memory (ROM), Electrical Erasable Read-only Memory (EEPROM), Flash memory, etc.

Display device 16 outputs displayed images to a user of the system 10. Display device 16 can be any of a variety of types of displays, including LCD, Plasma, CRT, etc. Some implementations of the display device 16 include a screen having a screen size, e.g., an area within which images are displayed. Storage device 18 can store data that may be retrieved by the CPU (including program instructions and/or data for graphical application 15), and can be any of a variety of devices such as a hard disk, CD-ROM, DVD-ROM, Blu-Ray disc, magnetic tape, etc. Input devices 20 can include any of a variety of devices that allow users to input commands and data to the CPU, including a keyboard, mouse, trackball, stylus, touchscreen, microphone/voice recognition device, motion sensors, other electronic device (such as another computer system or portable electronic device), or other input device. Other peripherals 22 can include any other devices connected to and used by the system 10, such as any peripheral, card, or interface device that performs one or more functions and communicates with the system 10, such as network adapters that enable the system 10 to become coupled to other computer systems or devices through intervening private or public networks, scanners, printers, sensors, speakers, etc. In the example of FIG. 1, the display device 16 is connected to the CPU 12 by its own dedicated bus, while storage device 18, input devices 20, and other peripherals 22 are connected to a common bus that is also connected to the CPU. In other embodiments, the display device 16 and other devices can each have their own bus, or share one or more common buses. One or more of the buses or other links can be implemented using wires or wirelessly, according to any of well known standards and protocols.

The software graphical application 15 and interface of the present inventions can be implemented by the CPU 12 to display one or more images and/or interface on the display device 16 and receive input from one or more of the input devices 20 to control the functions of the application and interface. The software 15 can also be stored on storage device 18 and/or in memory 14. The functionality of software 15 is described in greater detail below.

Figure 2:
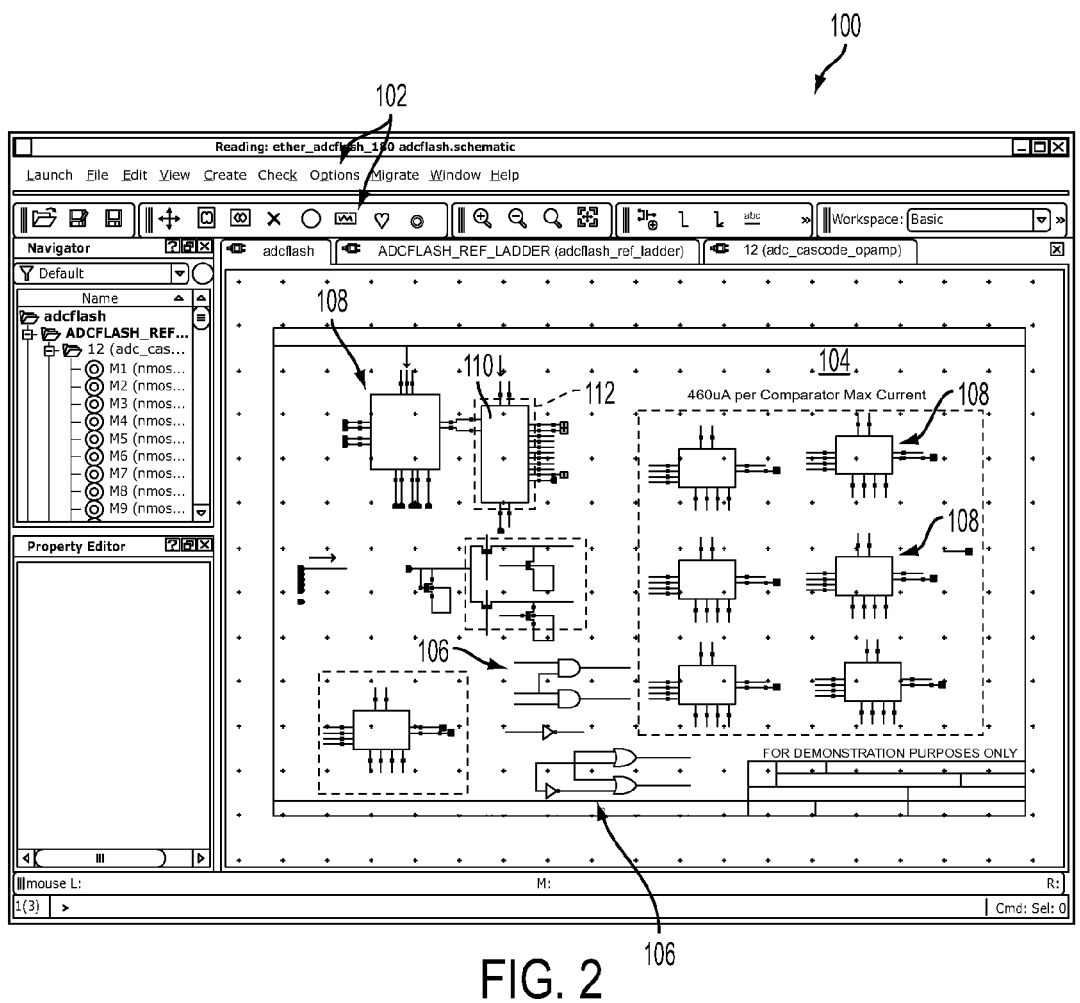
FIG. 2 is a diagrammatic illustration of an example embodiment for use with the present invention, including a graphical interface and displayed image.

FIG. 2 is a diagrammatic illustration of illustrating an example embodiment 100 of a viewing and/or editing graphical interface for a viewing and editing application 15 for use with the present invention, including a displayed interface and image. The interface is shown as a displayed window within a graphical user interface, but can be displayed in other forms in other interfaces. In the displayed interface 100, various controls 102 are displayed such as menu items and buttons which allow the user to select various viewing and editing functions of the application and interface 100. The interface 100 also displays a main image 104 which is created and/or edited by the user with functions of the interface 100. The image 104 displayed in the interface 100 can be part of a complete, larger image ("canvas") (or complete set of data of interest to the user) that is stored in the memory 14 or other data storage of the system 10, where only part of the complete image is displayed in the interface 100 at one time. Alternatively, or at other zoom levels, the image 104 can be the complete image.

In the example embodiment shown, a schematic design application is being used on system 10 and provides the interface 100. This application allows designers to create and edit schematics for circuits and other electronic designs (and may have many other functions, not detailed here). For example, the design application 15 of interface 100 displays a main image 104 which can be the entire canvas for the schematic design, or only a part of the canvas, and which depicts an integrated circuit having integrated circuit packages, transistors, logic gates, electrical traces, and other electronic components. The user can view, create, add, delete, or modify the components in the image 104, which in some embodiments can modify a data model of these components that corresponds to the displayed images. The interface 100 and graphical application provide well-known viewing and editing functions to allow the user to create and edit the components of the layout image 104. For example, a standard zoom-in function can be selected, to cause the image 104 to be displayed zoomed in so that the details of the image 104 at the current hierarchical level are displayed larger. Other embodiments may allow varying degrees of automation in the planning and/or layout tasks.

The graphical design depicted by the design application and interface 100 is complex enough to be broken up into multiple design hierarchical levels. To allow further ease in viewing and editing the different components of the design, each hierarchical level has a different amount of abstraction of graphical information of the design. Generally, the lower the hierarchical level, the greater amount of detail shown, but a less amount of the overall design is included at that level. A lower hierarchical level is not the same as a zoomed-in view of an area of an image, because a zoomed-in view would simply show a larger view of that same area including a larger view of any abstracted symbols at the current hierarchical level, and would not show the details represented by that symbol at a lower hierarchical level. A lower hierarchical level shows different, more complex details of a particular portion of the design, and requires a different "descend" operation to be viewed from a higher level rather than a zoom operation.

In the example of FIG. 2, the displayed layout image 104 depicts a circuit layout at a particular design hierarchy level, with various circuit components of the design displayed. At this hierarchy level, some circuit components 106 are shown as circuits having their full detail, such as logic gates, and thus having no lower levels of detail to view. Other circuit components 108 are shows as abstracted schematic symbols (e.g., symbol instances) that represent more detailed circuits that are not shown in full detail at the current hierarchy level. These symbols represent circuits that each have one or more additional, lower hierarchy levels of detail that can be viewed by the user if selected. For example, these circuits may have too much detail to view at the current hierarchy level without causing confusion in the design, and so that detail is abstracted using the schematic symbols 108. The schematic symbols are displayed as rectangles in the example shown, but can be displayed as other types of symbols in other embodiments.

The present invention allows a user to preview a portion of a design at a different hierarchy level simply and directly, as well as quickly and easily navigate to different portions and/or levels of a design without losing context of locations in the design. In this example, the user has selected a particular schematic symbol 110 for hierarchy level viewing according to the present invention. To indicate this selection, a dashed box 112 is displayed around the symbol 110. However, in some embodiments a different indication can be displayed to indicate selection, or no indication need be displayed.

An interface 100 of the present inventions include a display of preview images for other levels of a design hierarchy associated with displayed symbols in an image, which can significantly decrease the number of hierarchy-traversal operations needed from a user to perform layout design or other image manipulation. The performance and functionality of the preview display of the present inventions is described in greater detail below.

In other embodiments, other types of graphical designs can be displayed in interface 100 for other applications instead of circuit schematic or layout design. For example, line drawings, graphical objects, photo images, maps, or other images can be displayed, created and/or edited similarly to the layout image 104 described above. Such other embodiments and applications also may provide hierarchical levels in their designs which can be navigated by a user, and thus can also benefit from the present inventions.

Figure 3:
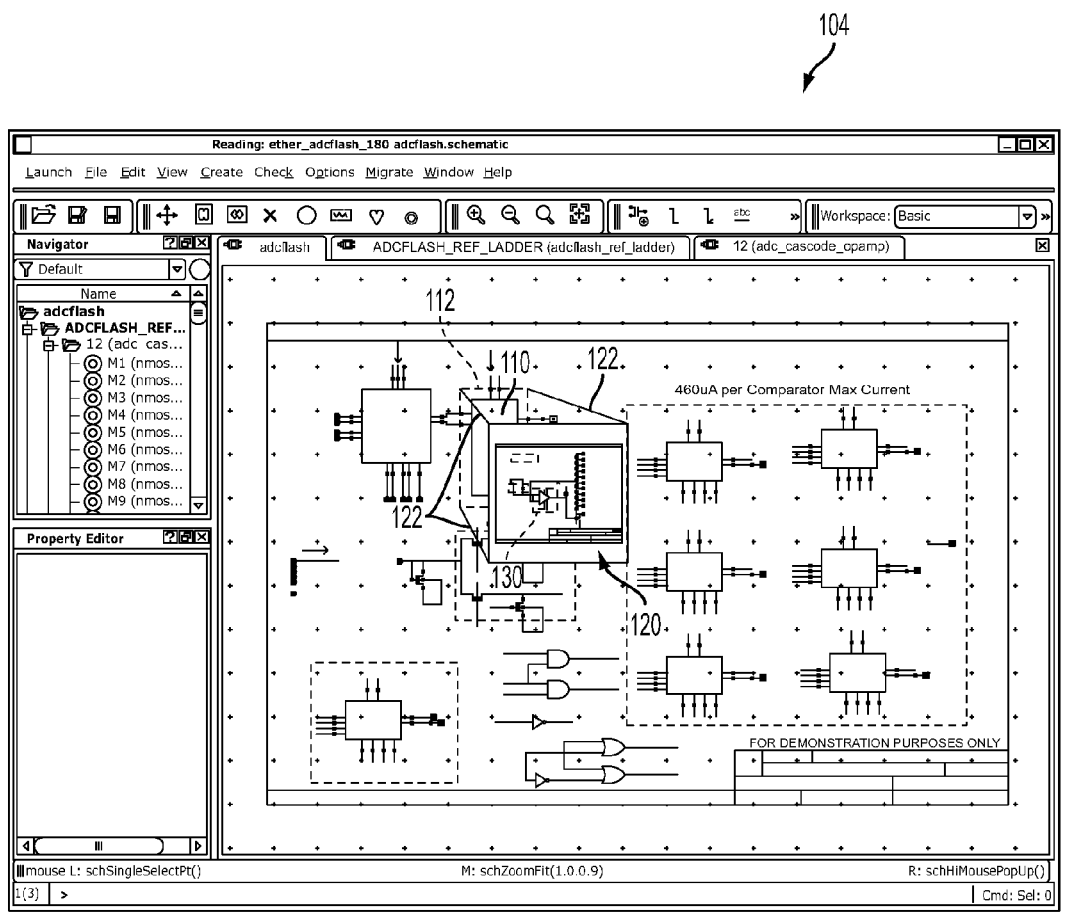
FIG. 3 is a diagrammatic illustration of the interface of FIG. 2 in which a preview image of the present invention has been displayed.

FIG. 3 is a diagrammatic illustration of main image 104 displayed in interface 100 of FIG. 2, in which a preview image 120 of the present invention has been displayed. The preview image, like the interface 100 and editing application, can be implemented by program instructions implemented by the system 10.

The preview image 120 is associated with a displayed symbol or object in the image 104. In the example of FIG. 3, a navigable symbol 110 (e.g., a symbol associated with at least one lower level of the design hierarchy to be viewed) has been selected by the user and a dashed box 12 displayed around its periphery to indicate the subject of the preview image. The selection may be preceded or accompanied by zoom and/or pan operations on the design canvas to allow the name of the symbol to be read and parsed by the user and to determine which symbol to select for preview.

A preview image can be invoked in any of several different ways in different embodiments. For example, in one embodiment a user can hover a user-controlled displayed cursor (mouse pointer, arrow, etc.) over a desired symbol having a navigable lower level into which a descend operation is permitted, or other associated preview image. The cursor can be controlled by a mouse, trackball, stylus, or other input device. After a predetermined period of time of hovering, it is assumed that the user wishes to preview a lower image of the symbol which is designated by the cursor. Thus the hovering action both selects the symbol which is previewed, as well as commanding the preview image to be displayed.

In various other embodiments other selection and commands to display the preview image can be provided in other ways, such as selecting a menu item, selecting a displayed button, pressing a key, key combination, button, or other input selection device on a hardware input device or peripheral, inputting a voice command, or providing the invoke command as input in another way. In other embodiments, the command to display the preview image can be received by the interface 100 or editing application from a user, another device, or other source.

In various embodiments, the user can also use different ways to select the symbol 110 of image 104 with which he or she wants the preview image to be associated. For example, the user might select the symbol 110 using a user-controlled cursor, a hardware key or key combination, menu item or displayed button, etc. In other embodiments, no user selection of a symbol 110 is input, and a preview image can be displayed for a default selected symbol of image 104, such as a symbol 110 at the center of the current image 104 as displayed in the interface 100, or within a predefined display area of the image 104.

In response to receiving the selection of the symbol 110 and the command to display the preview image (and any other needed inputs as required by a specific embodiment), the present invention causes the preview image 120 (or "thumbnail") to be displayed on a display device 16. The preview image 120 displays the corresponding lower-level portion of the design, e.g., the underlying next lower level design view of the symbol 110. In the example of FIG. 3, the preview image 120 displays a schematic sub-circuit having gates, connections, and other circuit components. In some alternate embodiments, a small "descend" icon or symbol may be displayed close to the symbol 110, which if subsequently hovered over by the cursor (or otherwise selected) will cause the preview image 120 to be displayed (e.g., similar to the ascend icon described below with respect to FIGS. 9-11). The preview image 120 is shown as a rectangle in the example of FIG. 3, but can be displayed as any shape, such as circular, oval, polygon, irregular, user-defined, etc. Generally, it also should be appreciated that the embodiments of the present invention enable the preview image 120 and the image 104 to both be displayed within a predefined viewing area on the display device 16, in which the predefined viewing area is usually bounded by the screen size of a display screen of the display device 16.

The preview image 120 provides the user with a small graphical preview of the underlying details that would be displayed in the full image 104 if the user decides to invoke a descend operation, e.g., to descend to portrayed hierarchical level. The preview image 120 can be set to a predefined size (user-selectable in some embodiments). For example, the preview image can be made smaller than the image 104, e.g., a fraction of the size of the image 104, so that the preview image does not obscure much of the current-level view of the design in image 104. The graphical preview, while still small and unobtrusive to the rest of the design, can encode sufficient graphical information to make recognition of the lower-level design details as a descend target a very quick, low-cognitive-load operation for the user.

The relationship between the preview image 120 and the schematic symbol 110 in the currently-displayed level of the design can be indicated graphically to aid the user in associating the preview image 120 with the corresponding symbol. For example, in the example of FIG. 3, this relationship is indicated by displayed lines 122 which connect the corners of the preview image 120 and the corners of the dashed box 112 displayed around the symbol 110. In other embodiments, the association lines 122 can connect to corners or edges of the symbol 110 itself. In still other embodiments, other linkage methods can be used, such as drawing the selection box 112 with a higher color intensity or other indicator, and simultaneously "dimming down" (lowering the color or light intensity) of the rest of the components on the current level of the design.

To reduce confusion and to assist quick selection by the user, the preview image 120 can be displayed relatively close to the associated symbol 110. For example, the preview image 120 can be set as a default setting to be displayed slightly displaced towards the right and below the associated symbol, which may cause the preview image 120 to at least partially overlap the image 104. This location provides a sense of context for a user as to which symbol 110 is being viewed at a different hierarchical level in the preview image 120, and the lower position of the preview image (lower than the symbol 110) indicates a lower level of the hierarchy is being portrayed. If there is no display space for the preview image 120 at the default location, the preview image 120 can be adjusted in position until there is sufficient space.

Other embodiments can display the preview image 120 at other locations, overlapping symbol 110 or not. It will be appreciated that the positions of the preview images relative to their corresponding symbol instances may be advantageously adjusted to minimize panning/scrolling of the design. For example, the preview image can be displayed to the upper left, upper right or lower left of the symbol to which it corresponds, and/or combined with dynamic scrolling of the canvas image 104 in order to allow the majority portion of the preview image to be visible. In some embodiments, the preview image 120 also can be moved, dragged, and/or re-positioned by the user or other input if desired. For example, the user can move a cursor onto the image 120, hold a button of an input device, and drag the image to another location using movement of a pointing device. The association lines 122 can be moved to follow the preview image 120 if the image 120 is moved relative to the image 104. Other embodiments can display the preview image 120 at a different distance from the associated symbol 110, or in a separate window overlapping or to the side of the main image 104 and/or interface 100.

In some embodiments, a display technique such as alpha blending may additionally be employed in order to allow transparency or translucency effects such that the preview image 120 is displayed in a translucent manner that allows the original design details of main image 104 to be visible through or in the image 120. For example, the user can set a particular amount of transparency that may allow darker, more intense, or larger features of the image 104 to be seen though the window 120, which may give the user additional useful contextual information in some embodiments.

Figure 4:
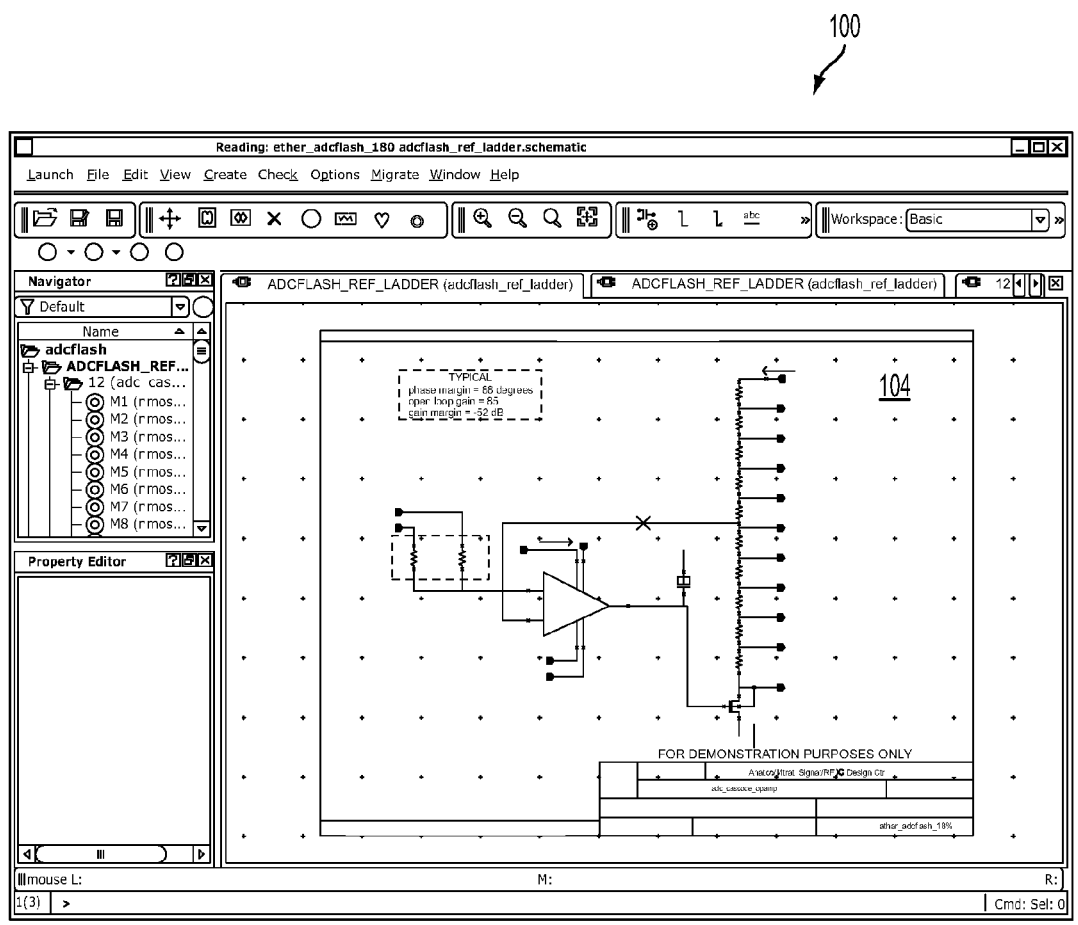
FIG. 4 is a diagrammatic illustration of the interface of FIG. 2 after the user has selected to descend into the portion of the design portrayed in the preview image of FIG. 3.

The user may descend into the previewed level of the design hierarchy by providing an appropriate navigation command to the interface 100. For example, in the example shown, a user may select (or "click on") any location on the preview image 120 using a user-controlled cursor. Other methods can be used in other embodiments to provide the descend command. Once the command is received, a descend operation is performed, e.g., the current displayed image 104 and the preview image 120 are removed from the display area of the interface 100 and the more detailed, lower-level previewed portion of the design is displayed as image 104. FIG. 4 shows an example of the image 104 of interface 100 after the user has selected to descend into the portion of the design previewed in the preview image 120 of FIG. 3. A larger, more detailed view of the previewed image 120 is displayed. The larger, more detailed view may, in turn, have one or more selectable symbols offering associated preview images controllable in a similar manner to the preview image 120 of FIG. 3, and which allow further descend operations to still lower levels of the design hierarchy.

In some embodiments, the preview image 120 can be removed from the display when the user makes a selection outside the image 120, e.g., clicks a mouse button when the mouse cursor is displayed outside the image 120. In some embodiments, the image 120 can alternatively or additionally be removed from the display when the user selects a displayed button in the image 120 (not shown), or a close command is otherwise input. The image 120 also in some embodiments can be resized using any of the standard methods for resizing windows in a graphical user interface. In some further embodiments, a magnification factor of the view of the image portion displayed in the preview image 120 can be adjusted and user-controllable. For example, a magnification slider or bar can be displayed in the image 120, such that the user can select the slider with a cursor and slide it to decrease or increase the magnification factor of the design portion displayed in the image 120, or select "+" or "−" buttons to increase or decrease the magnification factor.

In some embodiments, to allow faster and easier descend operations of multiple hierarchical levels, a preview image 120 may itself include one or more "hotspots" (if appropriate) which allow further descend operations into the design hierarchy. In the example of FIG. 3, the preview image 120 includes a dashed outline 130 surrounding an area or symbol of the portion of the design (schematic) displayed in the preview image 120. In other embodiments, such a hotspot can be designated with other markings, colors, etc. The user may select a hotspot to cause the interface 100 to display another preview image, as described in greater detail below with respect to FIG. 5.

In some embodiments, not all preview images are able to be rendered with hotspots that are clearly identifiable by a user. In some embodiments, only those hotspot indicators (e.g. dashed outline) are displayed which are visible and clearly recognizable within the preview image.

Figure 5:
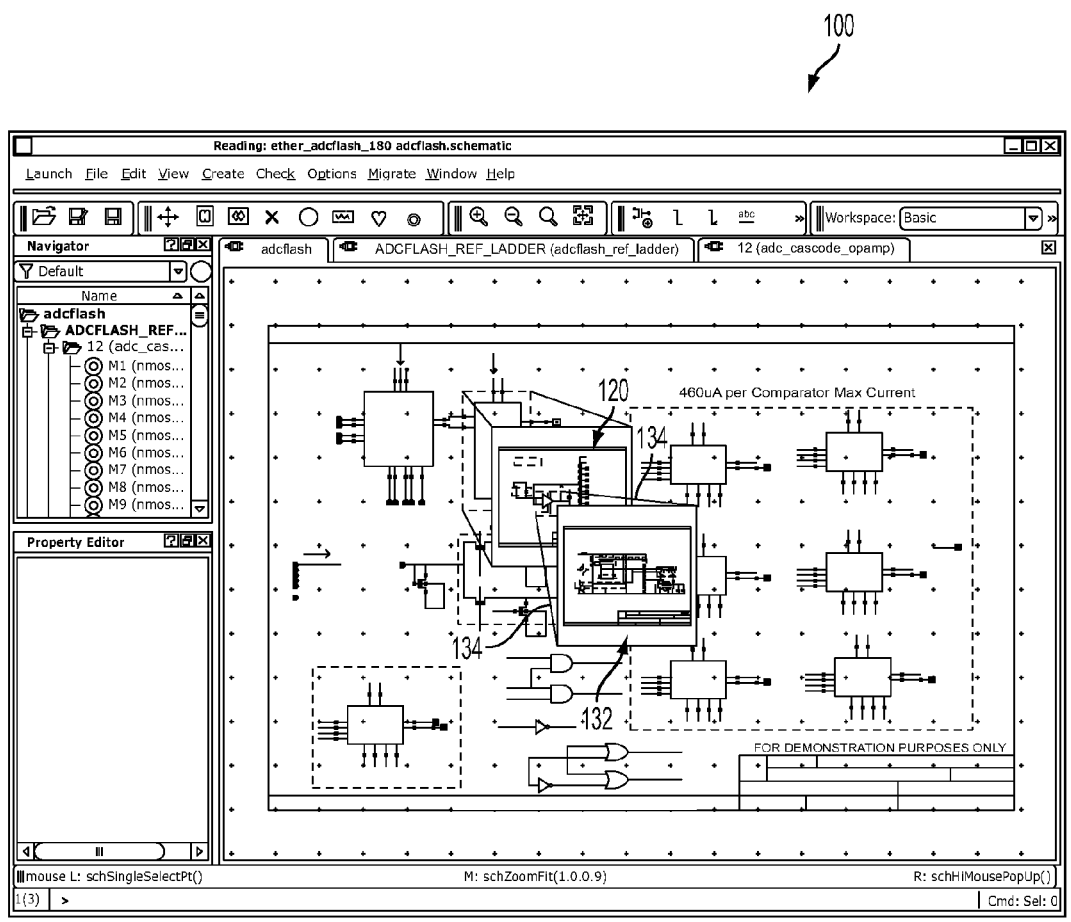
FIG. 5 is a diagrammatic illustration of the image of the interface of FIG. 2 after the user has selected a hotspot of the preview image.

FIG. 5 shows an example of the main image 104 of interface 100 after the user has selected a hotspot of the preview image 120 of FIG. 3. The hotspot of preview image 120 is designated by dashed box 130 or alternatively another graphical marking. The user can select the hotspot similarly as selecting the symbol 110 as described above for FIG. 3, e.g., by hovering a user-controlled cursor over any location in the hotspot for a predetermined amount of time. Alternatively, a different selection method can be used for selecting hotspots within preview images than for selecting symbols 110 displayed on the main image 104.

In response to the hotspot being selected, a second preview image 132 is displayed. Preview image 132 portrays a preview of the next lower level of the hierarchy for the design portion within the dashed box 130 of the preview image 120. In the example shown, all preview images are the same size, e.g., the preview image 132 is displayed the same size as preview image 120. Other embodiments can display differently-sized and/or shaped preview images, e.g., a size or shape based on the hierarchy level.

Figure 6:
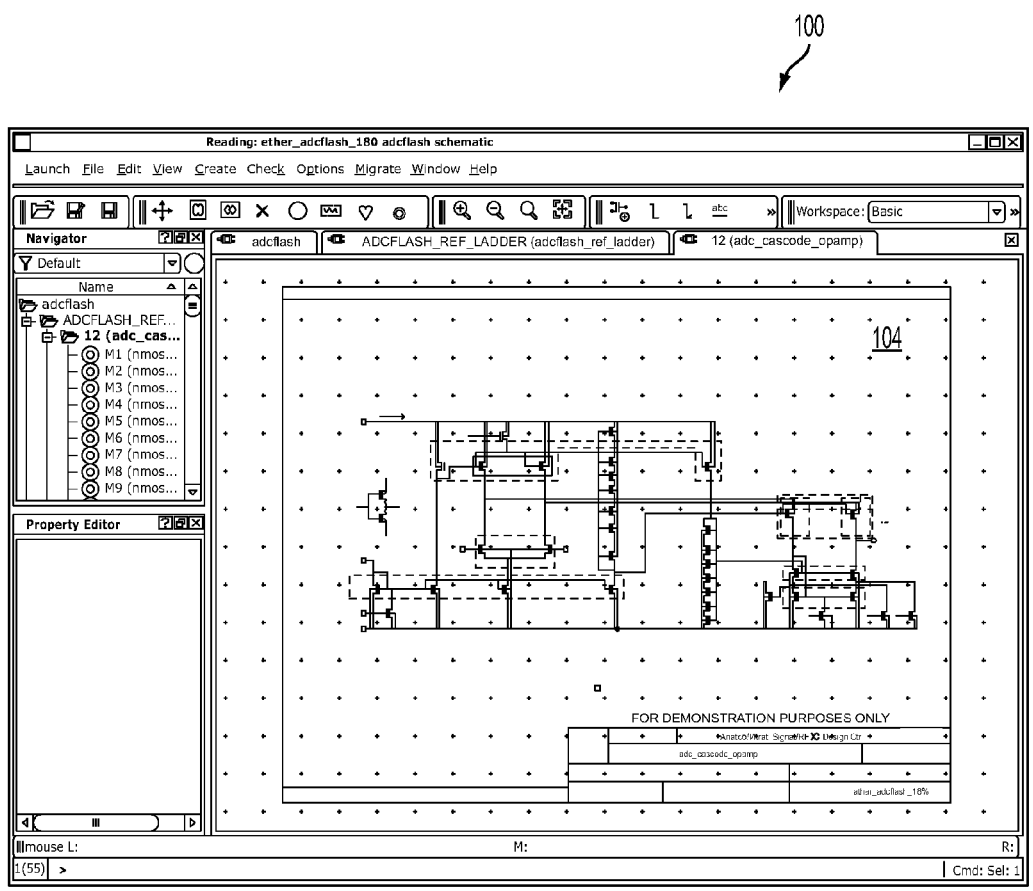
FIG. 6 is a diagrammatic illustration of the image of the interface of FIG. 2 after the user has selected to descend to the level within the second preview image of FIG. 5.

The preview image 132 or image 120 can be selected for navigation (e.g., a descend operation) at any location within its borders and not within any displayed hotspots in that preview image, e.g., using a hovering action of a user-controlled cursor at a location for a predetermined period of time. This causes the user to instantly navigate to the design portion depicted in preview image. Thus, any existing images displayed by interface 100 are removed and is replaced by a more detailed view of the design details depicted in the preview image. FIG. 6 shows an example of the image 104 showing the full version of the portion of the preview image 132 of FIG. 5 after the user has selected the preview image 132 for navigation.

The preview image 132 is shown displayed close to the preview image 120 from which the preview image 132 was created. This allows a small movement of the user's cursor from the preview image 120 to the new preview image 132. Furthermore, association lines 134 are displayed connecting the corners of the preview image 132 to the corners of the dashed box 130 in preview image 120 indicating the selected hotspot. Thus the preview image 132 can include similar display features of the preview image 120. In some embodiments, the features can be different in each preview image to distinguish it from other displayed preview images.

Each preview image thus can include one or more hotspots to allow a descend operation to a lower level of the design hierarchy for the designated symbols or areas in the hotspots, if such a lower level is available. For example, when a sub-schematic in a preview image itself contains further hierarchy (e.g. a sub-sub-schematic), the instances within the sub-schematic can be hot-spottable in a similar manner. This allows multiple descend operations to be commanded all at once, in what appears to be an atomic user operation. If multiple hotspots are provided in a preview image (or in main image 104), each hotspot can be associated with a different symbol or area of the design. In some embodiments, each hotspot may cause a descend (or ascend) operation to a different hierarchical level than the other hotspots, if appropriate.

Some alternate embodiments can allow nested preview images 120, e.g., a smaller preview image displayed within a larger preview image. For example, if the first preview image is large enough, then a smaller nested preview image can be displayed entirely within the first preview image in relation to its hotspot similarly as shown in FIG. 5.

Figure 7:
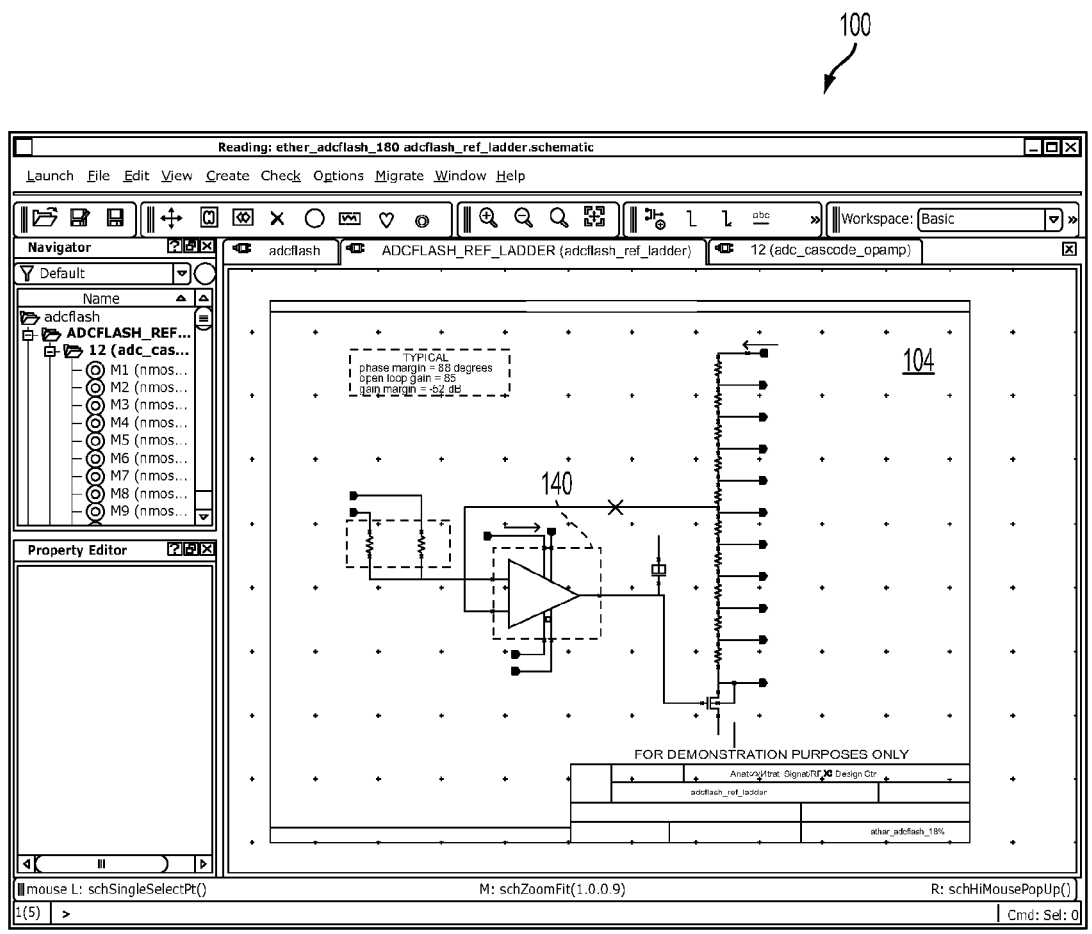
FIG. 7 is a diagrammatic illustration of the interface of FIG. 2 displaying a detailed view of the portion of the circuit depicted in preview image of FIG. 2 and showing another hotspot.

After causing the display of multiple preview images, such as preview images 120 and 132, the user can select any one of the displayed preview images for navigation to cause main image 104 to be displayed as a larger detailed view of that previewed portion of the design. In some embodiments, if a first preview image includes a hotspot, and a second, lower-level preview image has been displayed for that hotspot, then when the first preview image is descended into, the hotspot can be displayed in the resulting descended main image 104. FIG. 7 shows such an example, where the user has selected preview image 120 of FIG. 5 to descend into (e.g., selected outside its hotspot) while the lower-level preview image 132 is displayed on the screen. As shown in FIG. 7, main image 104 thus displays a more-detailed view of the symbol or portion of the circuit depicted in preview image 120. A dashed box 140 is also shown for the hotspot corresponding to the previously displayed preview image 132, allowing the user to select the hotspot in image 104 to cause the preview image 132 to again be displayed. In other embodiments, all available hotspots are always displayed in a resulting main image 104.

Figure 8:
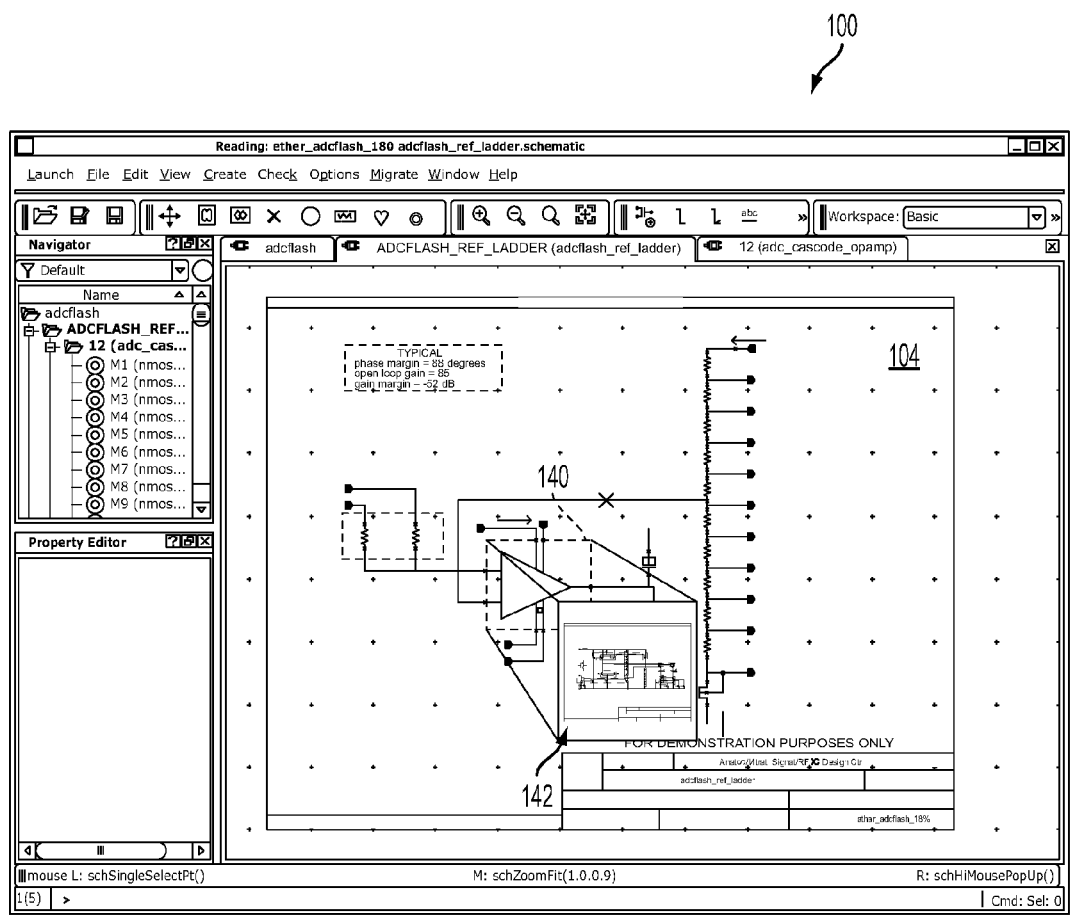
FIG. 8 is a diagrammatic illustration of the interface of FIG. 2 displaying a preview image of a lower hierarchical level after the user has selected the hotspot in the dashed box of FIG. 7.

FIG. 8 illustrates a view of interface 100 in which the user has selected the component in dashed box 140 of FIG. 7 for displaying a preview image of the next lower level. The preview image 142 is displayed after the user has selected the hotspot 140. The preview image 142 depicts a lower-level view of the symbol or component within the box 140. The user can select a descend operation by selecting within the preview window 142 similarly as described above.

Figure 9:
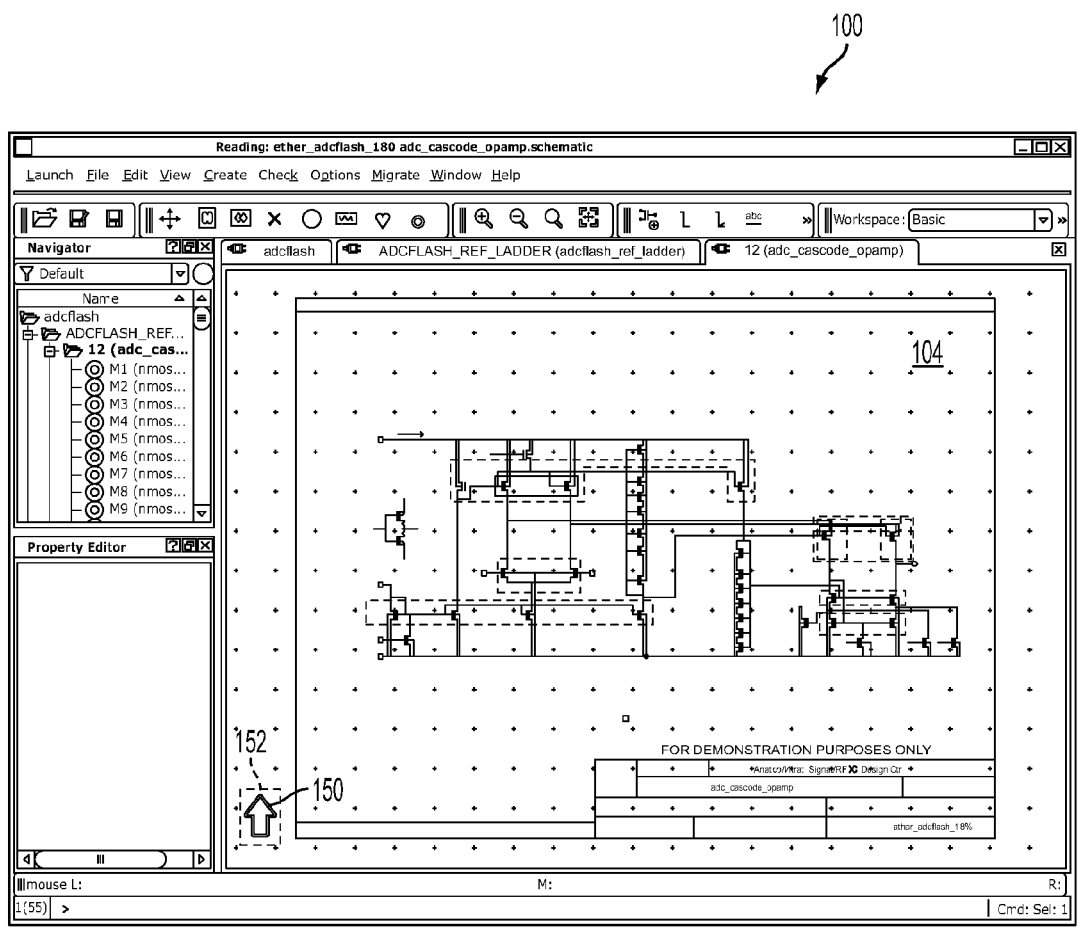
FIG. 9 is a diagrammatic illustration of a detailed view of the portion of the circuit depicted in preview image of FIG. 8 and an ascend icon of the present invention.

In FIG. 9, the user has performed a descend operation such that the portion of the design displayed in the preview window 142 of FIG. 8 is displayed as main image 104. The main image 100 of FIG. 9 also displays an ascend icon 150. The ascend icon 150 allows a user to ascend or "navigate up" from a lower hierarchical level of the design, to a higher-level of the design hierarchy (if a higher level is available). The ascend icon 150 can be displayed in any image 104 for which a higher level of the design hierarchy exists, e.g., any hierarchical level lower than the highest available level.

The ascend icon 150 can be displayed in any location of the main image 104 outside of any hotspots of the image 104. In some embodiments this location can be reserved for the ascend icon so that the user can always look in the same place in interface 100 to find the icon. The icon 150 is shown displayed in the lower left corner of the image 104 in the example of FIG. 9, but can be displayed in other locations in other embodiments. Some embodiments can dynamically display the ascend icon 150, e.g., the icon is displayed only when the user-controlled cursor has been moved within a predetermined distance to the icon. Some embodiments can display a dashed line 152 around the ascend icon 150 to indicate that it is a hotspot analogous to other hotspots described herein.

The ascend icon 150 can be selected to cause a preview image to be dynamically rendered and displayed similarly to selecting the symbols and hotspots described above. The user can select the ascend icon 150 for a preview image in any of various ways, such as hovering the user-controlled displayed cursor over the icon 150 similarly as described above.

Figure 10:
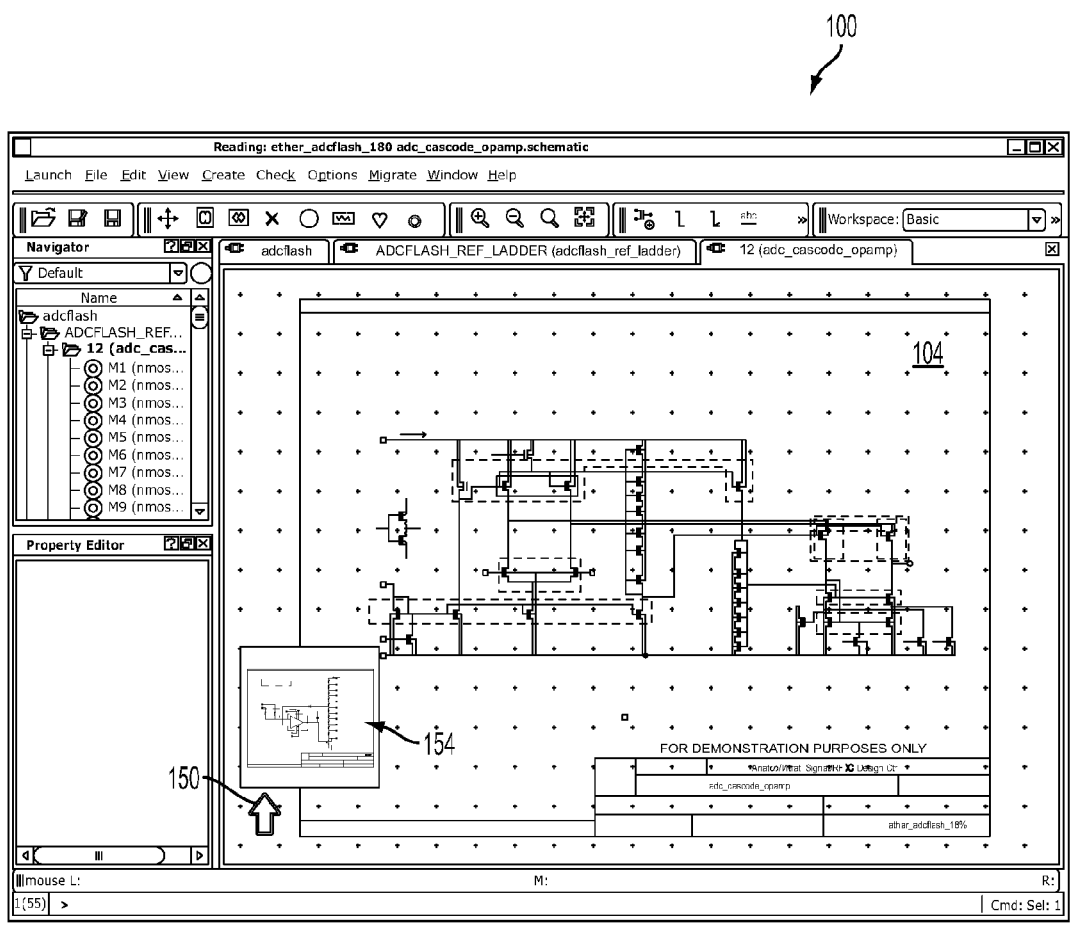
FIG. 10 is a diagrammatic illustration of the interface of FIG. 9 displaying a preview image selected for display by the user interacting with the ascend icon.

FIG. 10 illustrates the interface 100 displaying a preview image 154 that has been selected for display by the user interacting with ascend icon 150, for example, moving a cursor or cursor over the icon 150 for a predetermined period of time, or otherwise selecting the icon 150. In some alternate embodiments, the ascend icons and preview images can be displayed directly over the current cursor position upon activation of a particular hardware key, for example.

The preview image 154 depicts a view of the design at a higher level of the design hierarchy, where the depicted portion of the design includes the design portion currently shown in image 104, but in an abstracted fashion. For example, a circuit shown as image 104 might be displayed as an abstracted symbol in the preview image 154, similar to symbol 110 of FIG. 2. This higher level of the design is the higher-level design context for the image 104.

Figure 11:
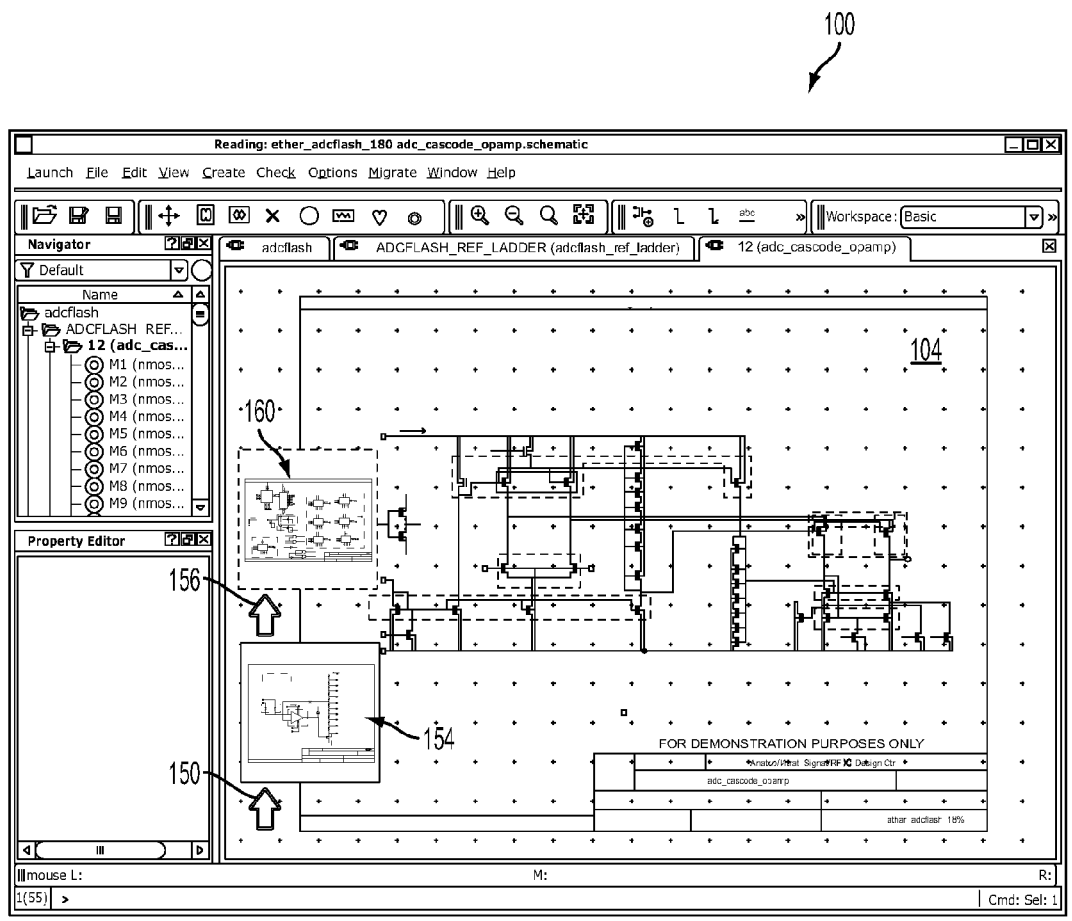
FIG. 11 is a diagrammatic illustration of the interface of FIG. 10 displaying an additional ascend icon and preview image.

FIG. 11 illustrates the display of interface 100 if the user selects the preview image 154 for additional preview (rather than for navigation (ascent) to the depicted portion of the design). In this example, the user selects the preview image 154 for additional ascending options. For example, the user can simply move the user-controlled cursor into the displayed area of the preview image 154 (without clicking on that image 154), which causes another ascend icon 156 to be displayed near the preview image 154. When the user selects the ascend icon 156 (e.g. by hovering the cursor over the icon 156 or clicking on it), another preview image 160 is dynamically rendered and displayed near the second ascend icon 156. Preview image 160 depicts the design at a next higher level after the design level shown in preview image 154. Additional preview images showing higher levels of the design hierarchy can continue to be commanded and displayed similarly, if additional higher levels are available. For example, each preview image can be displayed above the previous preview image in image 104, to intuitively indicate the higher hierarchical level depicted relative to the other preview images. In other embodiments, the additional preview images and ascend icons can be displayed in other areas of the interface 100 and/or commanded using other methods.

The user can invoke an ascend operation in any of the preview images 154 or 156 to cause the image 104 to display the corresponding portion of the design at the hierarchical level depicted in that preview image. The ascend operation can be invoked using a predetermined command. For example, after the user moves the cursor into preview image 154 and the second icon 156 and preview image 160 are displayed, the user can perform a command such as clicking a mouse button or other key to invoke the ascend operation of preview window 154. Furthermore, a predetermined command, e.g. as any mouse click outside of the icons and preview images, can cause the preview images to be removed from the screen, and no navigation operation is performed.

It is to be noted that users often descend down to a lower level view (e.g. sub-schematic or sub-sub-schematic) to perform one or more tasks at that level, and then ascend again to a higher level or even the top level of the design hierarchy, before again descending on a new descend path, e.g. to do similar tasks in a "sibling" cellview of a circuit. Some embodiments of the present inventions can facilitate this down-up-down-into-another type of navigation sequence.

Figure 12:
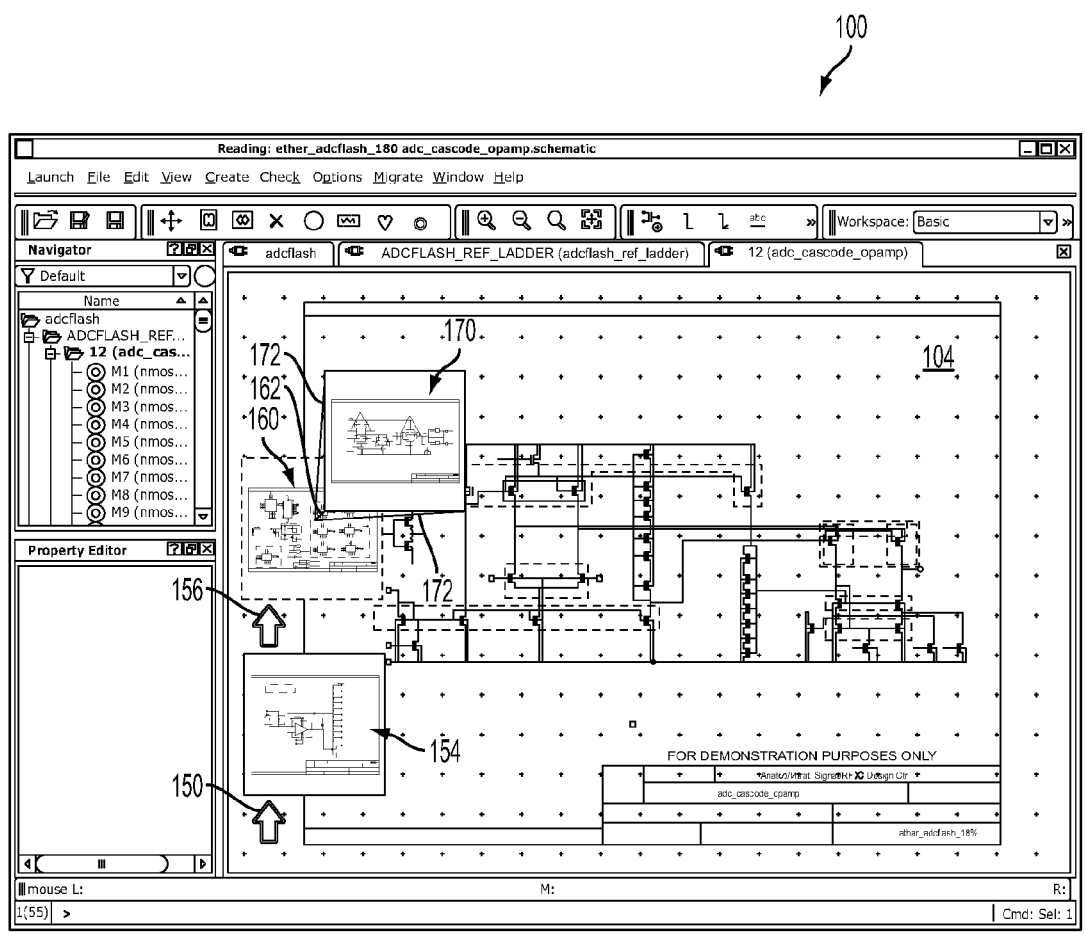
FIG. 12 illustrates an example of using the preview images of the present invention to perform a navigation of a design hierarchy including ascending and descending operations.

FIG. 12 illustrates an example of using the preview images of the present invention to perform a navigation of a design hierarchy including ascending and descending operations. In this example, the user is able to cause a resulting desired main image 104 to be displayed resulting from the equivalent of a two-level ascend operation, followed by a one-level descend operation.

The user starts by selecting the ascend icon 150 for its associated preview image, e.g., by hovering the cursor over the icon 150. Preview image 154 is then displayed. The user moves the cursor over the preview image 154, causing the ascend icon 156 to be displayed. The user moves the cursor over the ascend icon 156, causing the preview image 160 to be displayed. The user moves the cursor over the preview image 160; in this example, the image 160 depicts the highest level of the design hierarchy, so no ascend icon is displayed (however, if a higher level existed, another ascend icon would be displayed above preview image 160). The user then moves the cursor over a hotspot 162 within the preview image 160, causing a descend-operation-style preview image 170 to be dynamically displayed, having lines 172 connecting it to the hotspot 162. The user then can move the cursor onto the preview image 170 and invoke a descend operation, causing the main image 104 to change to the view depicted in the preview image 170.

The user thus has performed the equivalent of two ascend operations and a descend operation, yet only had to invoke a single navigation operation at the preview image 170. It should be appreciated that such sequences of hierarchical descends, ascends, descends into siblings of the original displayed hierarchical level are quite common in today's integrated circuit design practices, and the graphical interface approach as employed by the present invention can significantly improve the turnaround of such ubiquitous operations, minimizing user errors (e.g. wasteful navigation into the wrong circuit or cell, etc.).

In other embodiments, multiple preview images of the present invention can be displayed for an associated symbol 110, associated hotspot within a preview image, or associated ascend icon. This offers a choice of different navigation options for the user. For example, a designer may create different versions of a particular portion of a design, such as different versions of a sub-circuit on different dates or times when experimenting with and testing different design options. Or, in some cases, there may be different types of presentations of a portion of a design that can be provided as different versions. For example, a particular circuit may be able to be displayed as a schematic version with circuit symbols, or as a physical version showing a physical layout view of the electrical traces, transistors, etc., or as a netlist version that describes the circuit as a text description of components and connections. Thus, for example, when a symbol, hotspot, or ascend icon is selected for displaying a preview image, all or some of the different versions of the next lower hierarchical level can be displayed, each version in a different preview image displayed adjacent to the cursor and/or each other. The user can then select any of the displayed preview images for navigation to cause the selected version to be displayed as the main image 104.

In some embodiments, the multiple preview images showing different versions can be displayed one at a time, where the user can browse through a sequence of the different preview images by inputting a particular command, such as an up or down arrow key or sliding a scroll bar to browse forward or backward through a sequence of the multiple preview images. Predefined or dynamically determined user preferences can additionally adjust which versions are displayed as preview images, e.g., only versions of a specific type (schematic, physical, netlist, etc.), only versions within a specified date range, only versions from a particular designer, etc.

The preview images of the present invention for previewing hierarchical descend and ascend navigational operations allow a user to view a variety of navigation options before any actual navigation operation is invoked and a new image displayed as image 104. For example, the user can preview descend and ascend operations in any desired order to locate the desired portion of the design that is desired to be viewed and/or edited. This can save significant time in finding the desired level and view and also allows the user to maintain a clear vision of the hierarchy of the design.

Figure 13:
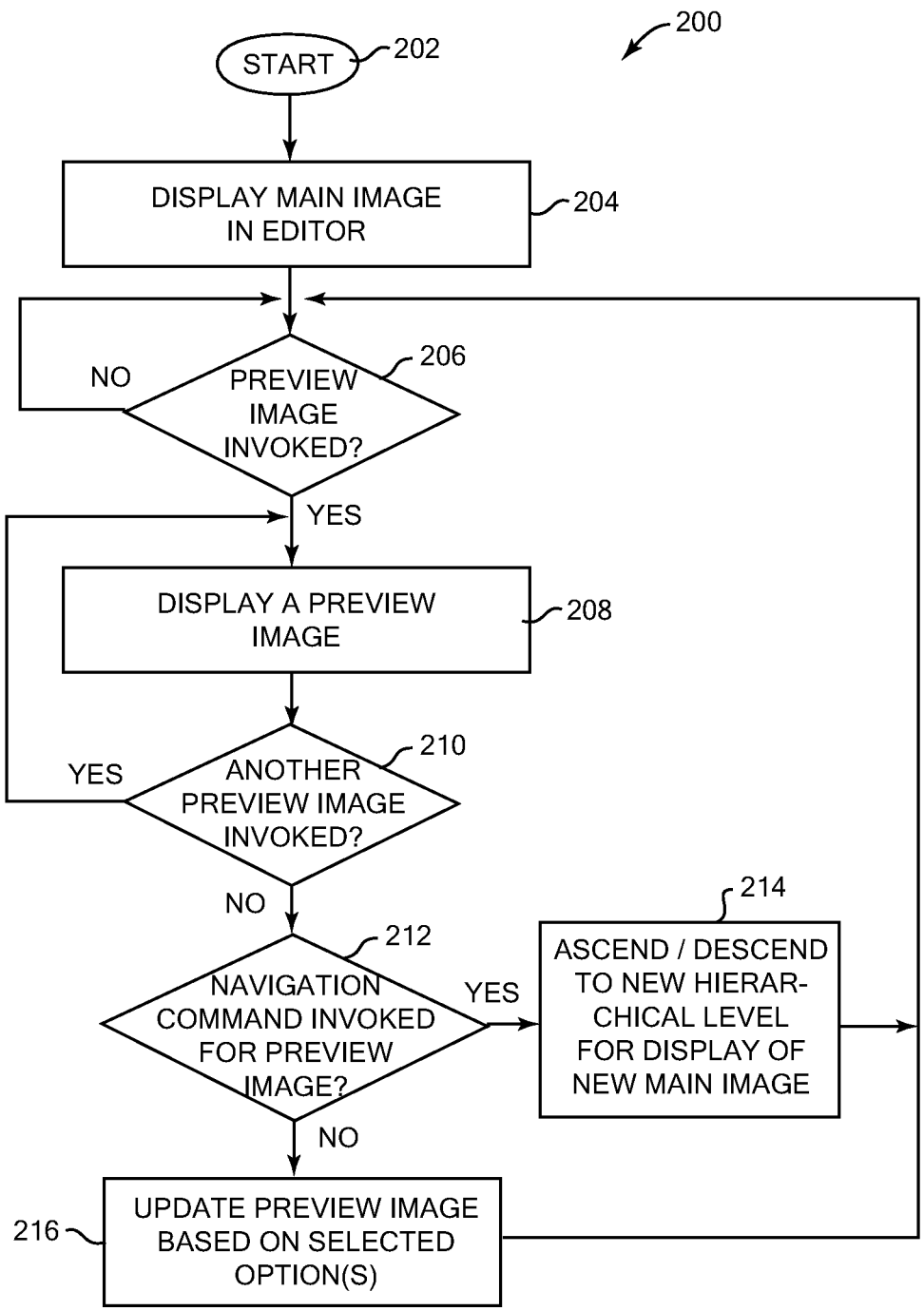
FIG. 13 is a flow diagram illustrating an example of a method of the present inventions for providing preview images in a graphical design.

FIG. 13 is a flow diagram illustrating one example of a method 200 of the present invention for providing preview images in a graphical design. Method 200 can be implemented, for example, by the components in system 10, including CPU 12. Method 200 can be implemented by program instructions or code, which can be stored on a computer readable medium. Alternatively, the method 200 can be implemented in hardware (logic gates, etc.), or in a combination of hardware and software.

The method begins at 202, and in step 204, the main image 104 is displayed by the editor application run by system 10. As described above, image 104 can be a complete image or part of a complete image or canvas, depending on the hierarchical level and/or zoom level of the depicted design and the interface/application. In step 206, it is checked whether a preview image 120 has been invoked. As indicated above, the preview image can be invoked with any of many possible inputs or commands. In the described embodiments, a preview image can be invoked in conjunction with a user-controlled cursor interacting with a displayed area on the screen, the displayed area being a displayed symbol, a hotspot within a different preview image, or an ascend icon. If a preview image has not been invoked, the system 10 and application continue their other operations and method 200 returns to step 206 to continue checking for preview image invocation.

If the preview image 120 has been invoked at step 206, then the method continues to step 208, in which the preview image 120 is displayed as described in any of the embodiments above. In step 210, it is checked whether another preview image is invoked. For example, additional preview images can be invoked using another displayed symbol, selecting hotspots in existing preview images, or selecting an ascend icon as described in embodiments above. If another preview image is invoked, the process returns to step 208 to display an additional preview image. If not, the process continues to step 212, where it is checked whether a navigation command has been invoked for a preview image. The navigation command is a command to invoke either an ascend operation or a descend operation to navigate to the portion of the design depicted in a particular preview image. For example, such a navigation command can be provided by clicking within a preview image outside of a hotspot as described above. If a navigation command is invoked, then in step 214 the process ascends or descends as appropriate to the new hierarchical level depicted in the preview image, by displaying a new main image 104 at the new hierarchical level. The process then returns to step 206 for standard operation and checking for preview images.

If no navigation command is detected, then in step 216, updates can be made to the preview image based on one or more selected options or commands for the preview image (if any) made by the user, as described above. For example, the preview image may be removed from the screen if the user clicks a location outside the preview image. Or, a magnification factor of the preview image 120 can be changed, the image 120 can be moved, a preview image showing a different version of the design portion can be displayed, etc. The process then returns to step 206 or other appropriate state.

Navigating Connections of a Design Using Preview Images

The present inventions include another embodiment, in which preview images are used to assist in navigating connections of a design. Herein, a "connection" is a link or direct relationship between two objects that may be displayed in different hierarchical views or provided in different design components. For example, in a schematic circuit design, an electrical connection may exist between two different connection points or components, or a signal may be sent from one component that is connected to another component. For example, navigation of connections in a design is useful in a schematic circuit design, where a signal or connection line may need to be traced or "probed" to determine prior or subsequent connections, as well as sources and/or receivers of the signal, to debug errors or malfunctions in the design. Navigation of other types of connections can also be useful in other application types, such as object-oriented design, illustration, map viewing, route planning, etc. For example, street connections can be traced in a map designs between different map views.

The preview images of the present invention can assist in navigation of a design hierarchy when following connections. The invention allows a user to provide a probe selection of a first object in the main image of the design, causing a display of a preview image showing a different level of the hierarchy, the preview image showing a second object at the different level of the hierarchy that is connected to the first object. This allows the user to immediately see connection information at different hierarchical levels in preview images. FIGS. 18-29 illustrate examples of such embodiments in the context of a schematic circuit design.

Figure 14:
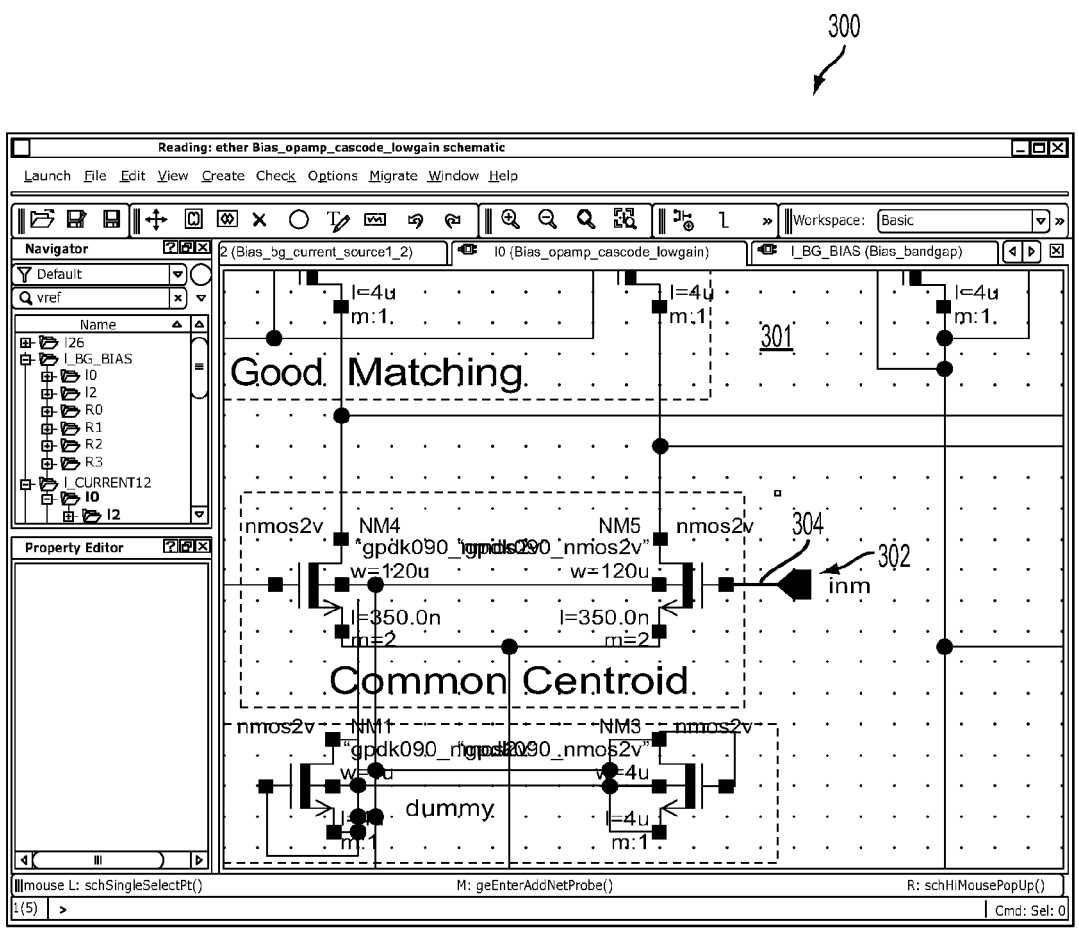
FIG. 14 is a diagrammatic illustration of a previous display screen interface displaying a view of a portion of a schematic circuit design.

FIG. 14 is a diagrammatic illustration of a previous display screen interface 300 displaying a view 301 of a portion of a schematic circuit design at a lower level of the design hierarchy. Interface 300 includes features similar as described above, including displaying a portion of a main image 301 of the design. In this example, the program displaying the interface 300 can simulate circuit operation by providing signals on the connections of the circuit design. With reference to FIG. 14, the user has determined that a waveform or signal ("inm") 302 on a particular input pin connection 304 of the design is not behaving as desired, and wishes to determine how the signal is generated in the design and what component drives that signal. The user can "probe" the connection 304 using a function of the interface 300, which provides the user connection information as to how and to what components the signal and connection 304 are connected. In the example shown, the connection 304 is selected by the user, and the selected connection is highlighted in the display. Furthermore, previous components and connection lines in the signal flow path that are connected to the selected connection 304 are also highlighted in appropriate other portions of the design. Some circuits may not have a clear flow path and so components and lines simply connected to the selected connection are highlighted and may be navigated to using the present inventions.

Figure 15:
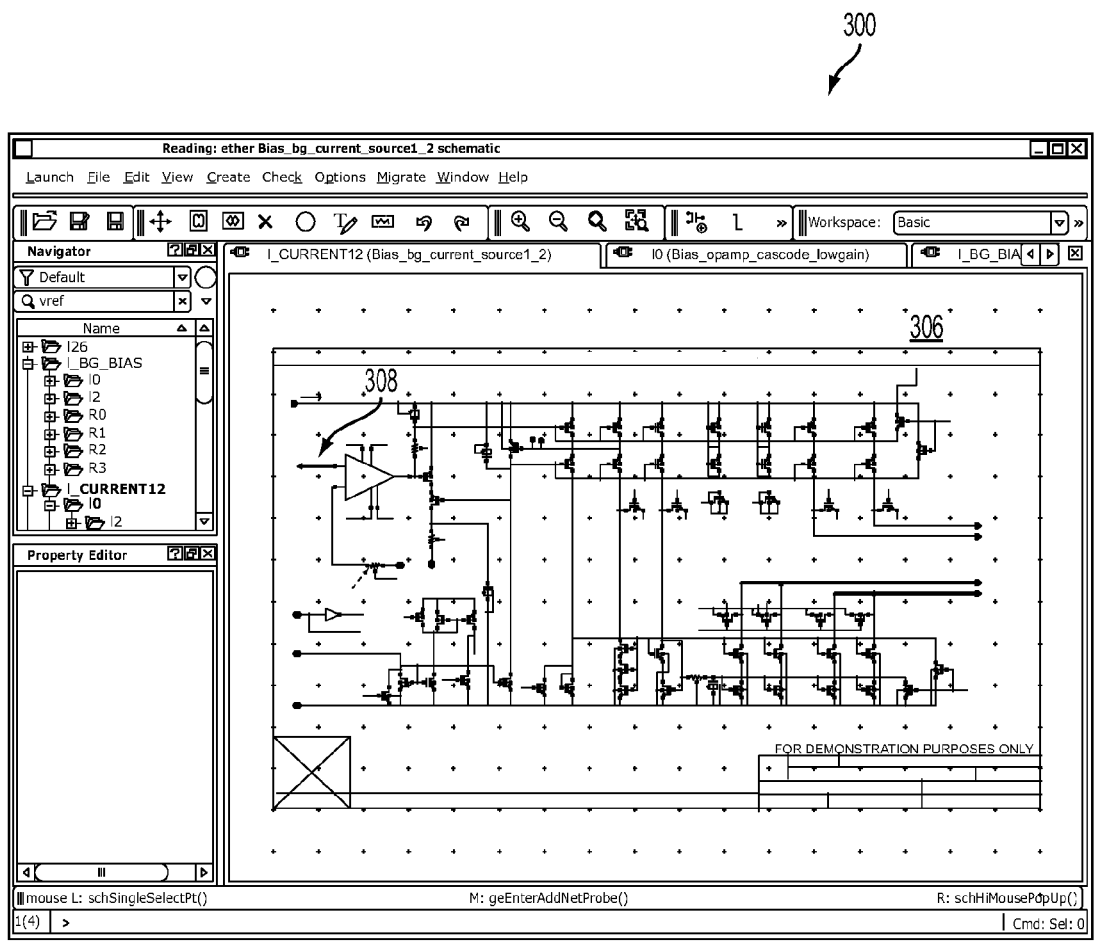
FIG. 15 is a diagrammatic illustration of a view that the user has navigated up to from the view of FIG. 14 and highlighting a connection.
Figure 16:
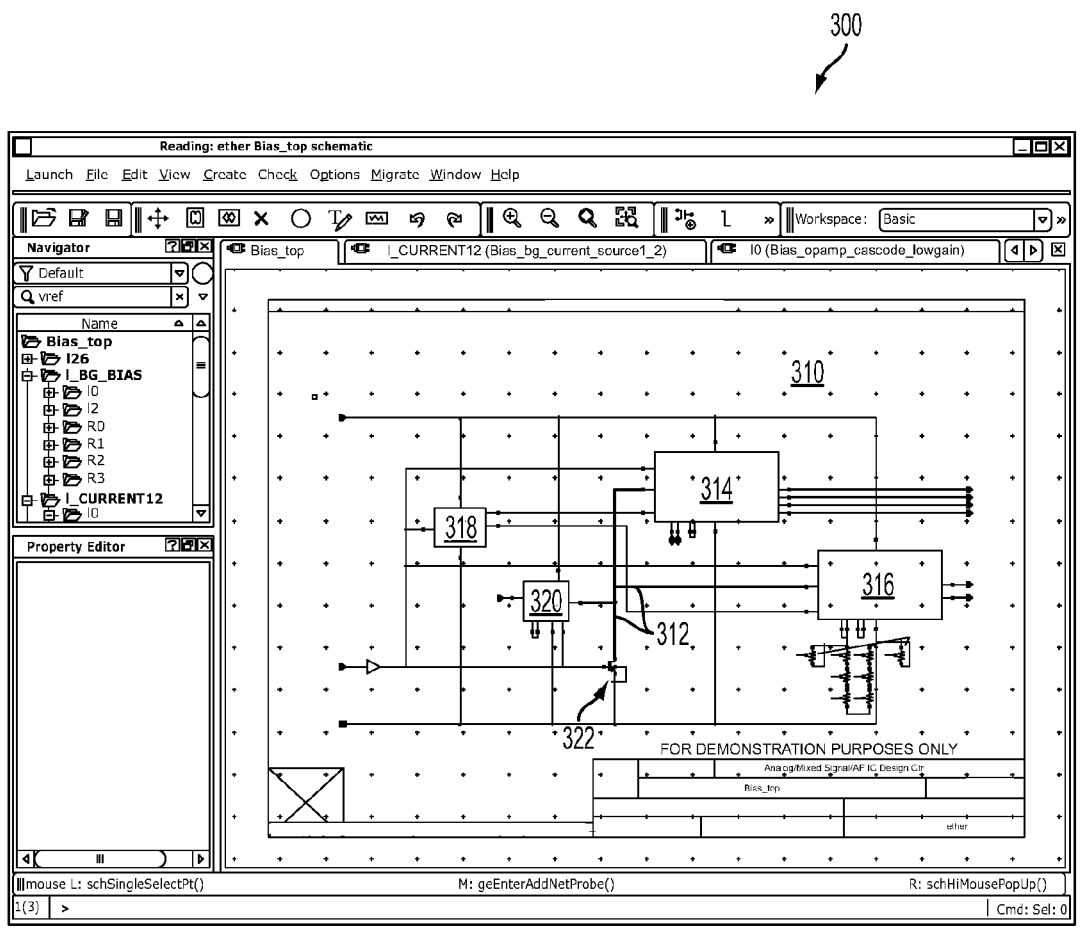
FIG. 16 is a diagrammatic illustration of a view in the interface of FIG. 14 after the user has performed an ascend operation in the hierarchy.
Figure 17:
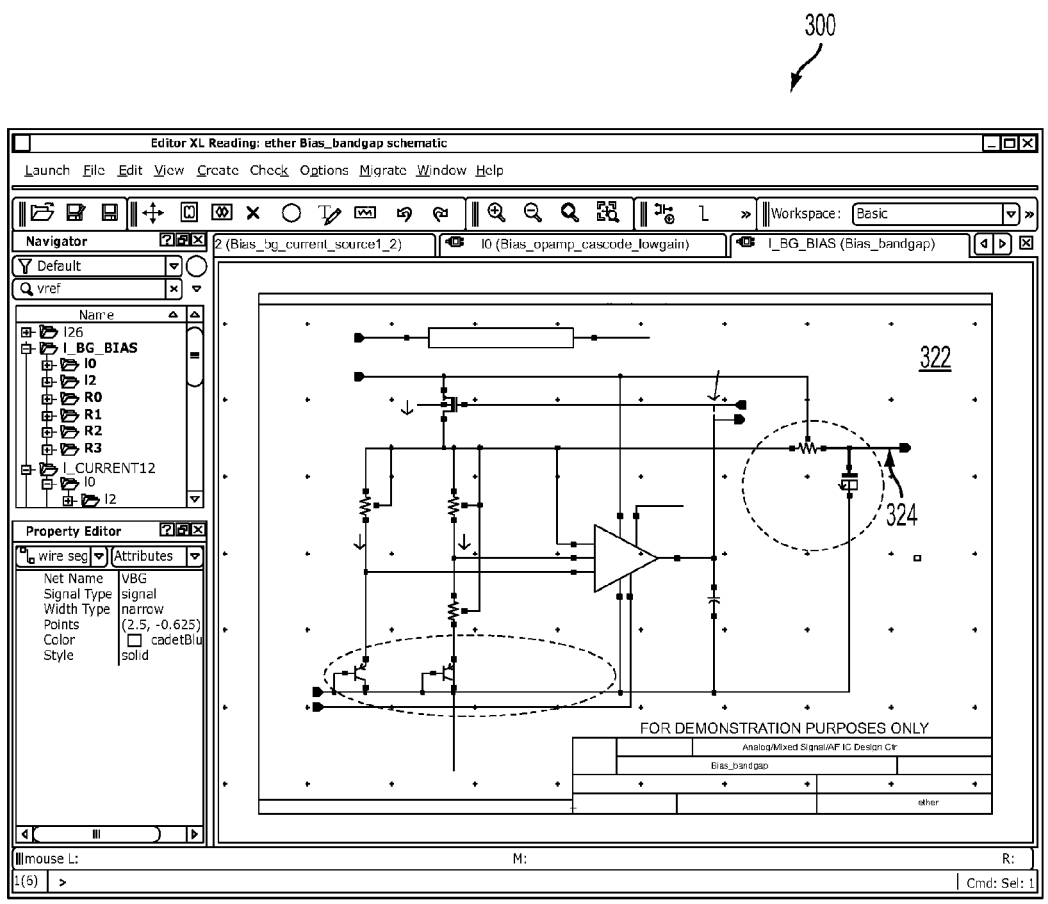
FIG. 17 is a diagrammatic illustration of a view in the interface of FIG. 14 after the user has descended a level into a component.

In many previous implementations of interface 300, the user can determine which design components are driving the connection 304 by navigating up the design hierarchy and to other parts of the design. FIG. 15 is an example of a view 306 in interface 300 that the user has navigated up to from the view 301 of FIG. 14, where a connection 308 is highlighted. Connection 308 carries the signal that is provided to connection 304 and may be previous to connection 304 in the signal flow path. Connection 308 is connected to another input pin at a previous connection. Therefore, the user again performs an ascend operation in the hierarchy so that a view 310 is displayed in interface 300, as shown in FIG. 16. The connection 312 provides the signal connected to the selected connection 304 and is highlighted for display. In this view, the connection 312 is connected to four instances, where one of the instances 314 was the instance ascended from and shown at a lower hierarchical level in FIG. 15, and the other instances 316, 318, and 320 are other connected components. The user decides to descend a level into the component 320, and the resulting view 322 is shown in FIG. 17 showing the highlighted connection 324 having the probed signal. The user is now in a block or component in which the probed signal is connected to an output pin, and the driver of the connection 304 is thus identified in view 322. As shown, this type of connectivity investigation by a user typically leads to a multitude of navigation events to try and find a driver or cause for a signal, including repeating a common set of sequential navigation operations, creating a large number of different probes followed by navigation (descend/return) operations, and/or by lots of navigation operations being followed by probing.

One problem with the above procedure is that by the time the user has navigated to the view 322 in FIG. 17, the user may have forgotten or lost track of the context of the original component or problem he or she was interested in or debugging. The user would then have to navigate back, reversing the above steps, to find out this information. All of these navigation operations take the user through a single level of the hierarchy at a time, displaying each navigated level as the main view, which gives the user the opportunity to forget the "big connectivity picture" and/or his task, or otherwise get distracted with resulting loss of context. Alternatively, in some applications the user may be able to start off with the selected connection 304 in FIG. 14 and choose a "Find driver(s)" function from a menu. This would take the user directly to the view 322 of FIG. 17 in a single operation. However, the problem with such a result is that again the user loses sight of his or her location and the relative locations of the connection 304 and 324 in the hierarchy and the design, therefore losing context, and typically has to do additional navigation operations to determine locations and context. The navigation preview images of the present invention can assist in alleviating these problems, allowing the designer to interactively follow connectivity through the design without so many operations or opportunities to lose context.

The present invention provides preview images to assist the user in navigating connections that may be spread out around a design. The preview images can be used similarly as described in the embodiments above to display several views of different hierarchical levels on a single display screen or view, allowing the user to maintain context in the hierarchy.

Figure 18:
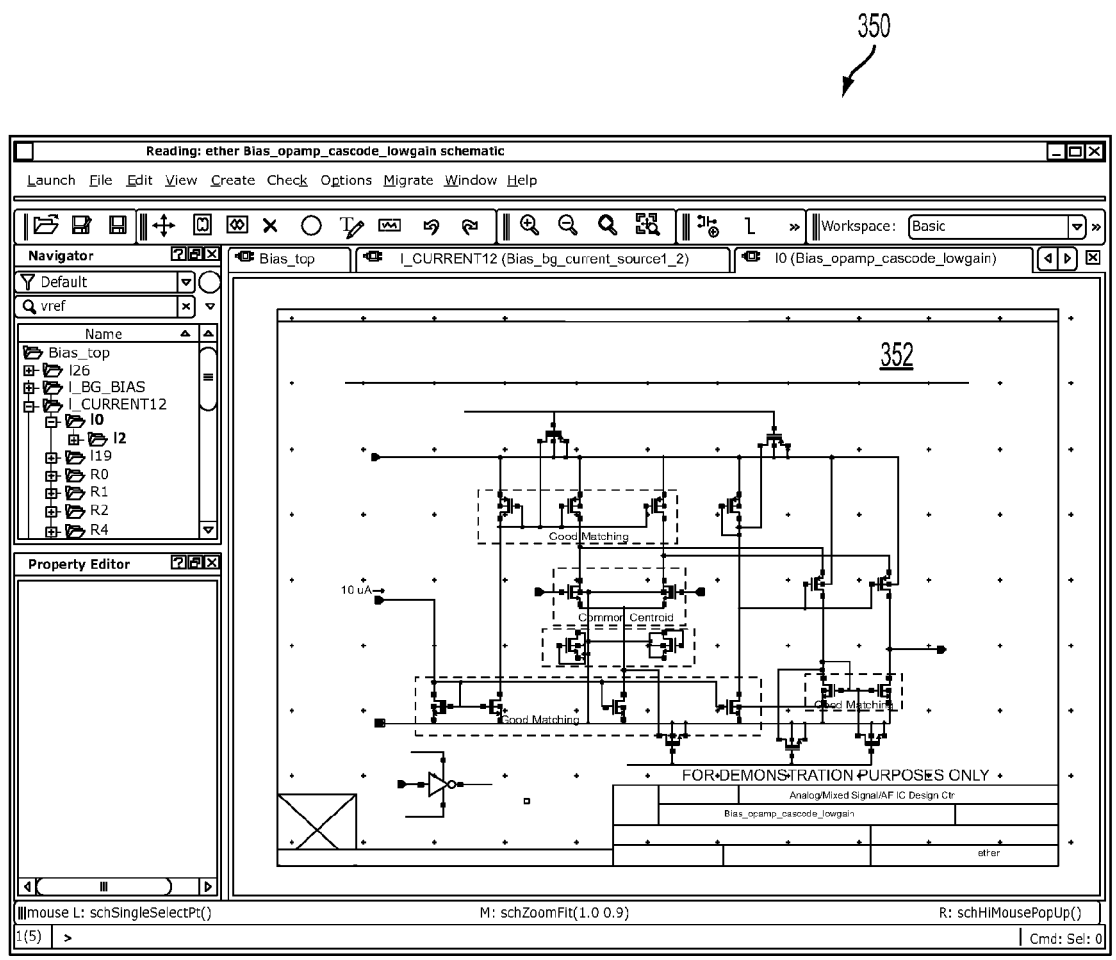
FIG. 18 is a diagrammatic illustration of a view of an interface which can provide the preview images of the present invention.

FIG. 18 shows an interface 350 which can provide the preview images of the present invention. In this example, the program displaying the interface 350 can simulate circuit operation by providing signals on the connections of the circuit design. In one example, interface 350 allows display and editing of schematic circuit designs. FIG. 18 shows a view 352 of a portion of a circuit design, for which the user desires to trace a signal along different connections of the circuit design. Such an embodiment can, for example, allow a user to probe a connection (or signal on that connection) among different hierarchical levels using the preview images of the present invention to assist the procedure. Other embodiments can provide similar features for other types of designs having other types of linked objects besides connections of a circuit.

Figure 19:
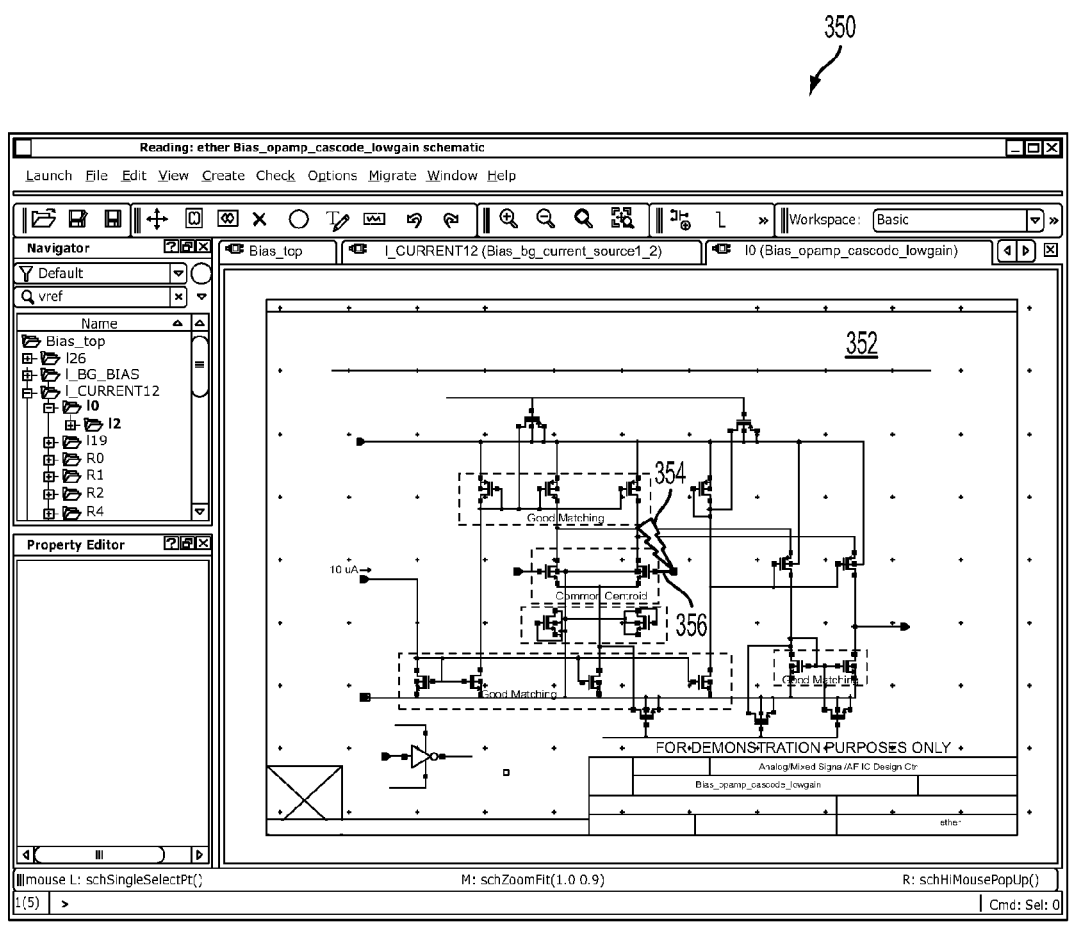
FIG. 19 is a diagrammatic illustration of a view of the interface of FIG. 18 after a user has invoked a command to follow a connection in the design.

FIG. 19 shows interface 350 showing view 352 after a user has invoked a command to follow a connection in the design, e.g., a "follow signal" or probe command for the schematic circuit design shown in this example. In some embodiments, to indicate that the selection is in a probing mode, and to invoke the probe command, the user can control a particular cursor to point to a connection or signal which is to be followed. For example, this example shows a special cursor 354 shaped like a lightning bolt that can be used as a "probe" to point with its pointed end to the desired signal or connection, as controlled by the user via an input device. Other types or shapes of cursors can be used in other embodiments.

Figure 20:
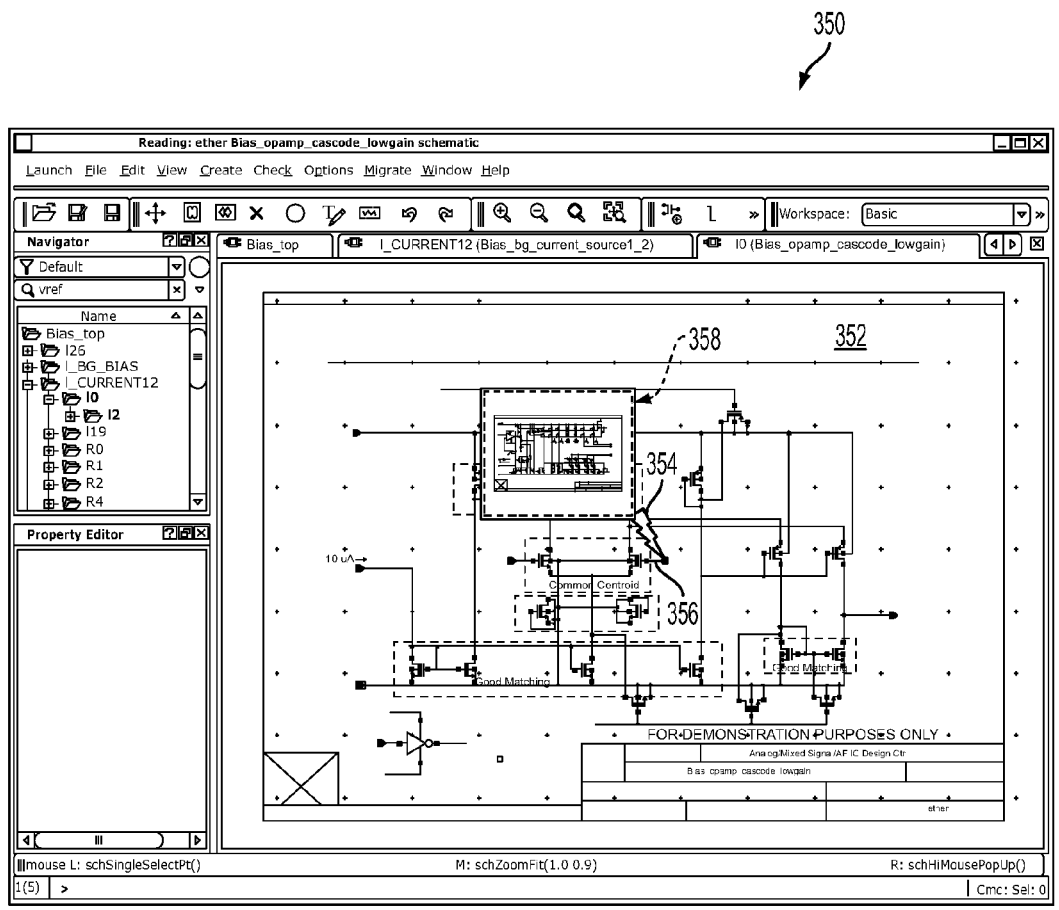
FIG. 20 is a diagrammatic illustration of a view of the interface of FIG. 18 after a user has invoked a preview image command of the present invention to cause a preview image to be displayed.

In FIG. 20, the user has invoked a preview image command of the present invention to cause a preview image (or "thumbnail") of the invention to be displayed. In some embodiments, once the probing cursor has been positioned at the desired location or connection (here, connection 356), the user can input a command (such as a mouse click or key command), which causes a static image probe indicator 354 to be displayed at the location of the cursor and causes a cursor to be displayed (not shown) to be moved by the user normally. In some embodiments the probe indicator can be the same image as the cursor 354 as shown. The probe indicator 354 points to the selected connection or other location. In some embodiments, an orientation (or other characteristic) of the probe indicator 354 can indicate whether a higher hierarchical level exists (e.g., non-pointing end oriented upward), or a lower hierarchical exists (e.g., non-pointing end oriented downward), for the selected connection.

Furthermore, a preview image 358 is displayed. The preview image 358 can in some embodiments be displayed immediately in response to the user selecting the connection 354 for probing, or can be displayed in response to a different user command. For example, in some embodiments the user can move a cursor (not shown) to a non-pointing end of the probe indicator 354 to cause a preview image 358 to be displayed.

The invoked preview image is displayed at a predefined location. In some embodiments, the preview image is displayed adjacent to or close to the selected connection, or close to the probe indicator used to indicate the selected connection. For example, in FIG. 20, the probe indicator 354 is shaped like a lightning bolt having a pointing (sharp) end and a non-pointing (blunt) end. The preview image 358 is displayed touching the non-pointing end of the probe indicator 354. Thus, the probe indicator provides for the user a graphical association or visual linking between the preview image and the probed connection. In other embodiments, the preview image can be displayed further from the connection or probe indicator, such as near to the probe indicator or further away, e.g. at one edge of the interface or display or in a dedicated separate window. In some embodiments, the preview image can be displayed with a different type of linkage indicator visually linking the preview image to the selected connection, as described in the embodiments of FIGS. 2-12.

Similar to the preview image embodiments of FIGS. 2-12 described above, the preview image 358 displays a different level of the design hierarchy. In this example, the preview image 358 displays the next level of hierarchy in the design above the current hierarchical level displayed in the view 352 of the interface 350. In other embodiments or based on different commands input by the user, a preview image can portray a lower hierarchical level, and/or a hierarchical level multiple levels away from the current level.

Figure 21:
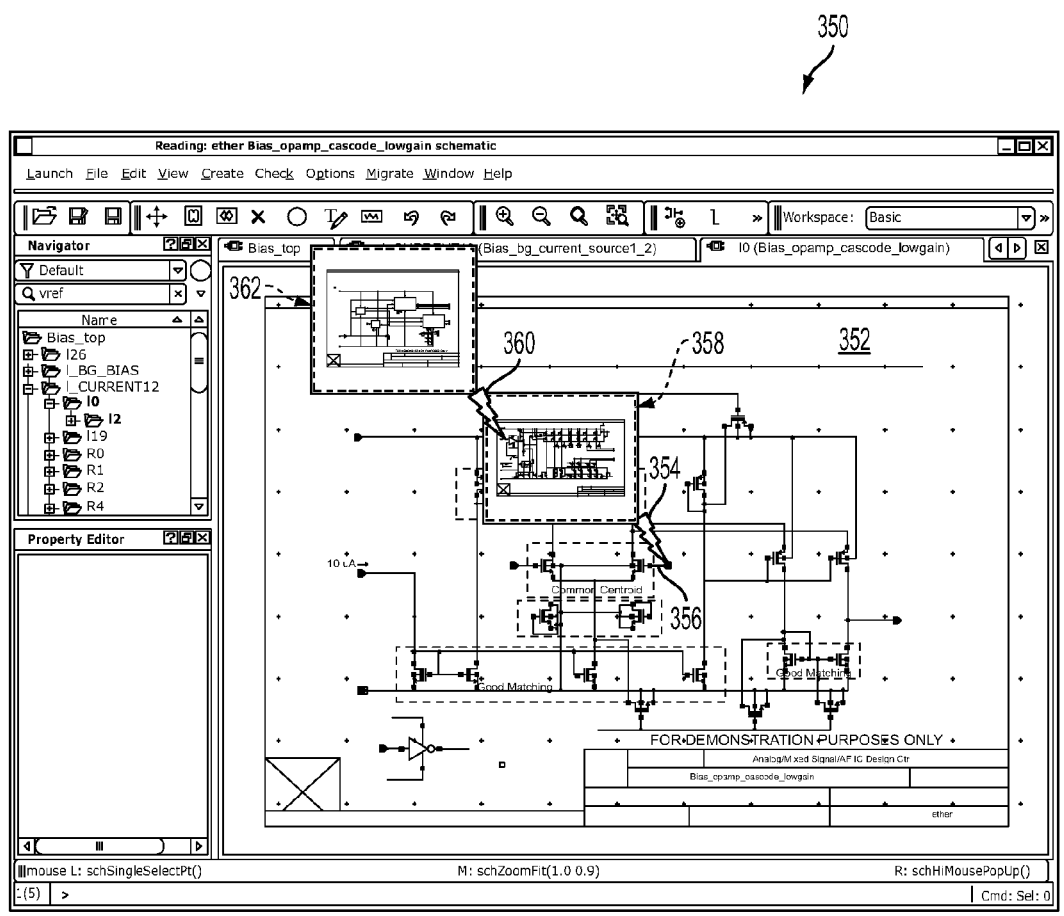
FIG. 21 is a diagrammatic illustration of a view of the interface of FIG. 18 after a user has moved a cursor into the preview image to cause a probe indicator to be displayed.

FIG. 21 illustrates the view 352 of interface 350 after the user has moved a cursor into the preview image 358. This causes one or more probe indicators to be displayed, each pointing to a connection in the preview image 358 that is connected to the selected connection 354. For example, probe indicator 360 is displayed pointing to a connection in preview image 358 that provides the signal to the connection 356, and in this case that connection is another input.

Furthermore, another preview image 362 is displayed at the non-pointing end of the indicator 360. In this example, preview image 362 shows the hierarchical level above the level of preview image 358 driving the input pin indicated in preview image 358. Thus, the user can view a next level of hierarchy of the design which drives the selected signal or is otherwise connected to the selected connection, in another preview image simply by moving a cursor into (or otherwise selecting) a current preview image. In other embodiments, the probe indicator 360 is displayed when moving a cursor into the preview image, but the next preview image 362 is displayed only when the user moves the cursor to a particular location, such as to the non-pointing end of the probe indicator 360. In some embodiments the preview image 358 can be displayed higher on the display screen than the preview image 358 to indicate a higher level of the design hierarchy.

In some situations or embodiments, the probe indicator 354 or 360 is not displayed (e.g., the preview image at the end of a sequence of preview images, in which the user's cursor is not located). In some embodiments, each preview image can highlight via a particular color or other characteristic, a signal or connection in the portrayed level of the hierarchy that is connected to the original probed connection 356.

Figure 22:
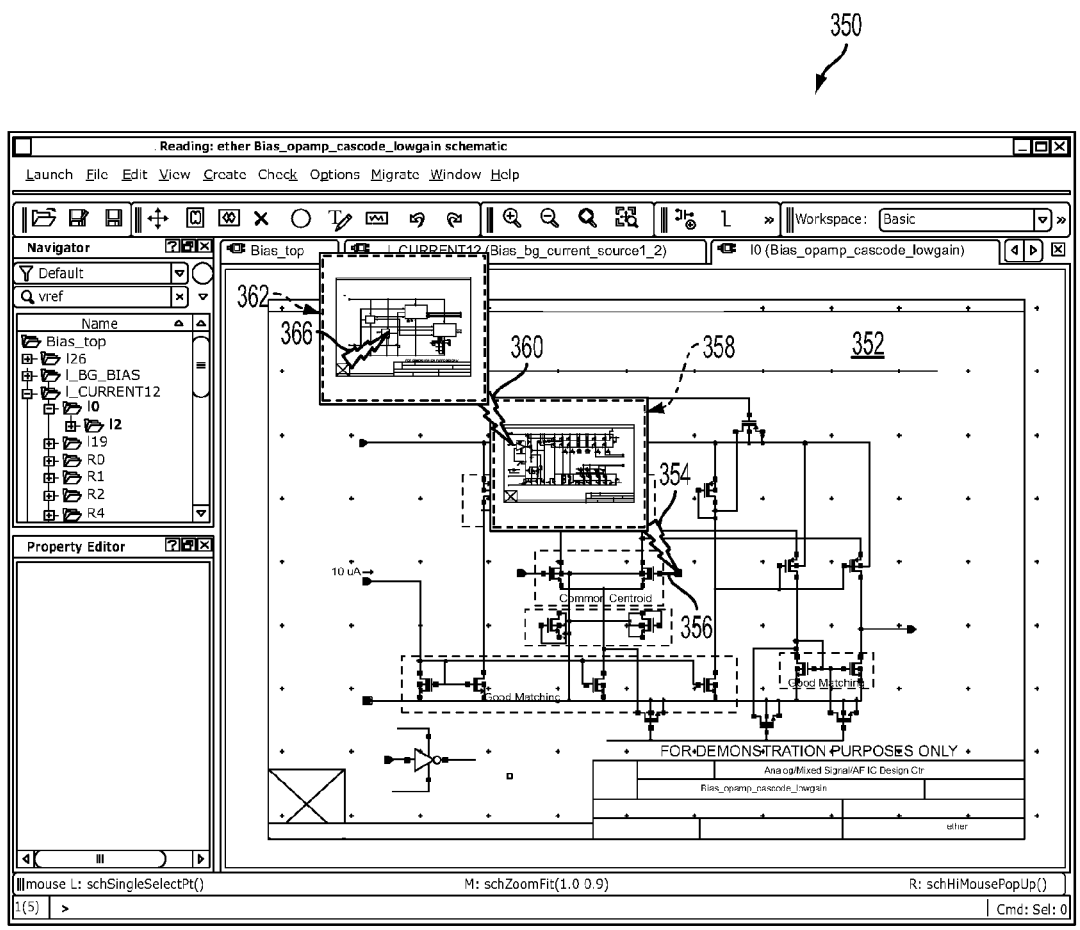
FIG. 22 is a diagrammatic illustration of a view of the interface of FIG. 18 after a user has moved a cursor into the preview image.

FIG. 22 illustrates the view 352 of interface 350 after the user has moved the cursor (not shown) into the preview image 362. Another probe indicator 366 is displayed within the preview image 362, pointing to the connection at the portrayed hierarchical level that provides the signal to the original selected connection 356. In this case, only a probe indicator 366 is displayed and not the next preview image at another hierarchical level. This is because the connection shown in preview image 362 is not connected to an input pin received from a source external to the view in the preview image, and so the user has a choice as which location or connection for which to display another preview image. In this example, the user can descend into any of four different instances 314, 318, 316, and 320, similarly as described above with respect to FIG. 16. In some embodiments, the probe indicator 366 can be displayed here with its non-pointing end lower than its pointing end, to indicate that further hierarchical navigation will be a descend operation, since this is the highest level of the hierarchy in which the probed signal and connection exists.

Figure 23:
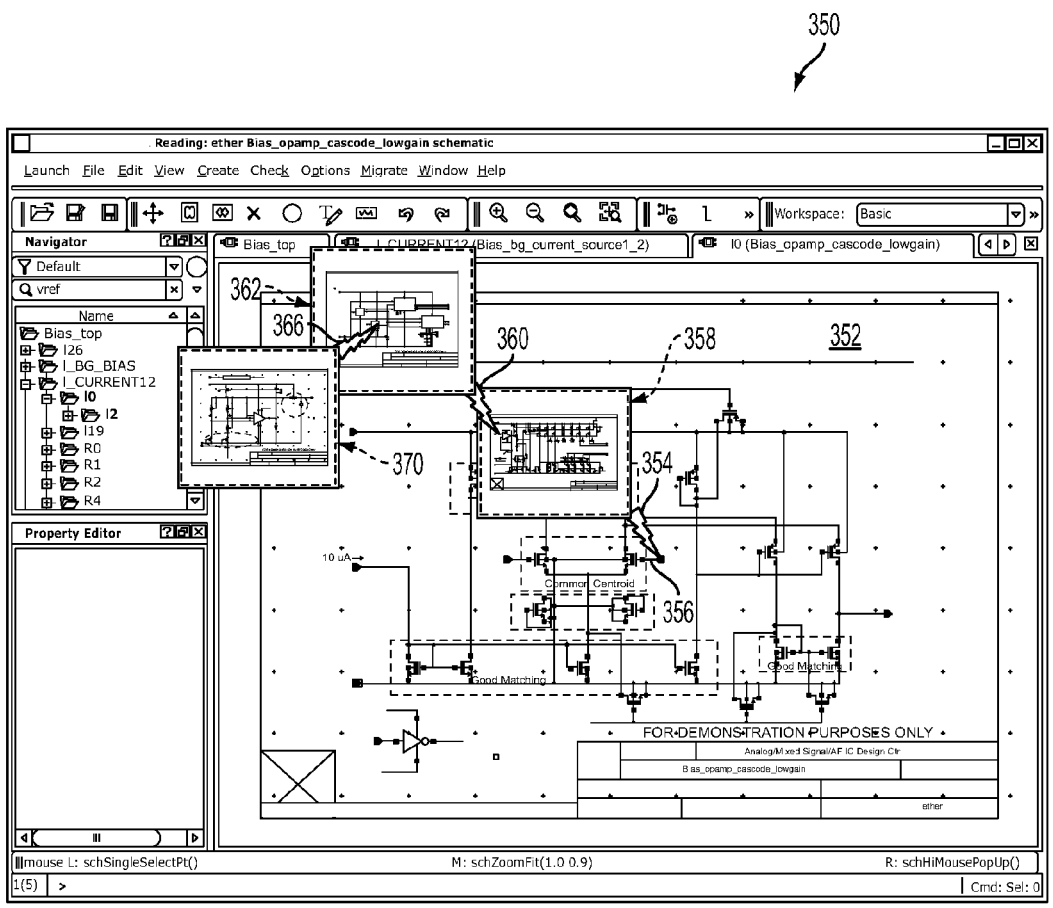
FIG. 23 is a diagrammatic illustration of a view of the interface of FIG. 18 after a user has input a command to display a second preview image.

FIG. 23 illustrates the view 352 after the user inputs a command to display another preview image, and the preview image 370 is displayed next to the probe indicator 366. For example, the user can decide to select the instance in the preview image 370 that corresponds to the particular instance 320 as shown in FIG. 16, if this instance is visible within the preview image 370. Instance 320 has been determined by the user to include the driver (or connection of interest) for the selected signal on connection 354. In some embodiments, since the user is descending into a lower hierarchical view, the preview image 370 is displayed lower than the previous preview image 362 to assist the user in determining the hierarchical context.

Figure 24:
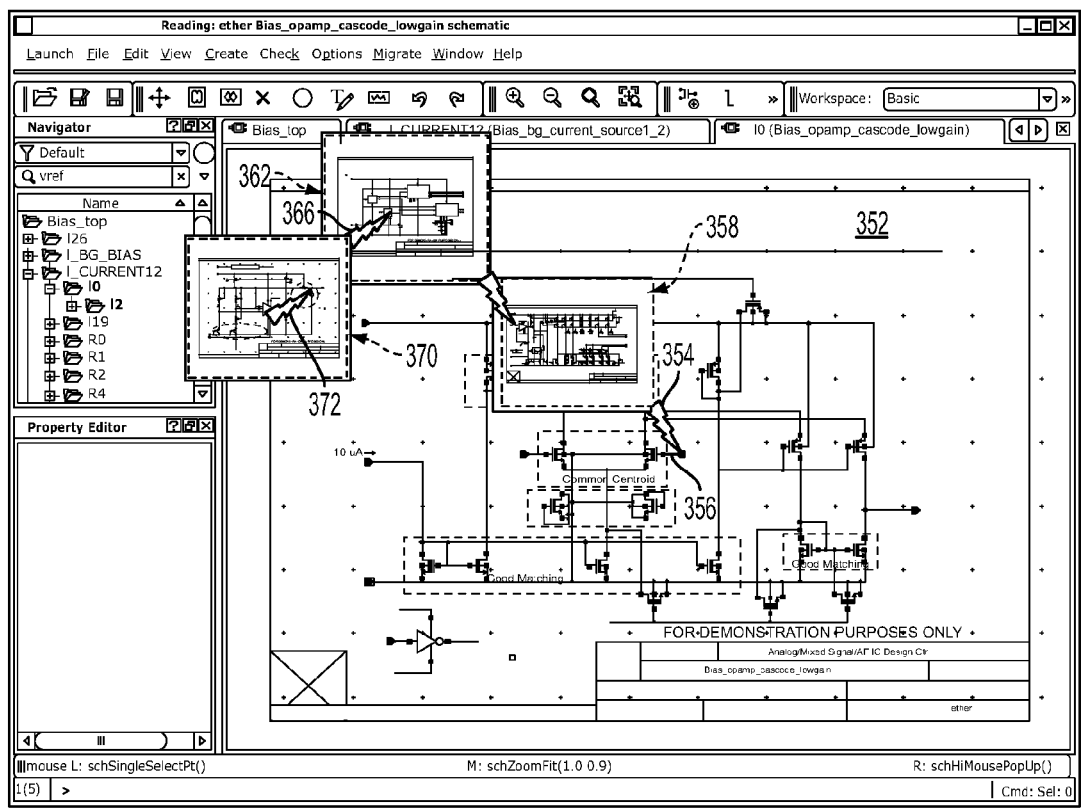
FIG. 24 is a diagrammatic illustration of a view of the interface of FIG. 18 after a user has moved a cursor into a third preview image.

In FIG. 24, the user has moved the cursor into the preview image 370, causing a probe indicator 372 to be displayed, pointing at the connection providing the signal to the original selected connection 356. In this example, the preview image 370 shows a view of the driver component that is driving or originating the signal at connection 356, with indicator 372 pointing to the actual signal being driven on the corresponding connection. Thus, there are no further hierarchical levels to be traversed to find the source of the signal at connection 356. The user can then select to navigate to the desired view, as described below.

Figure 25:
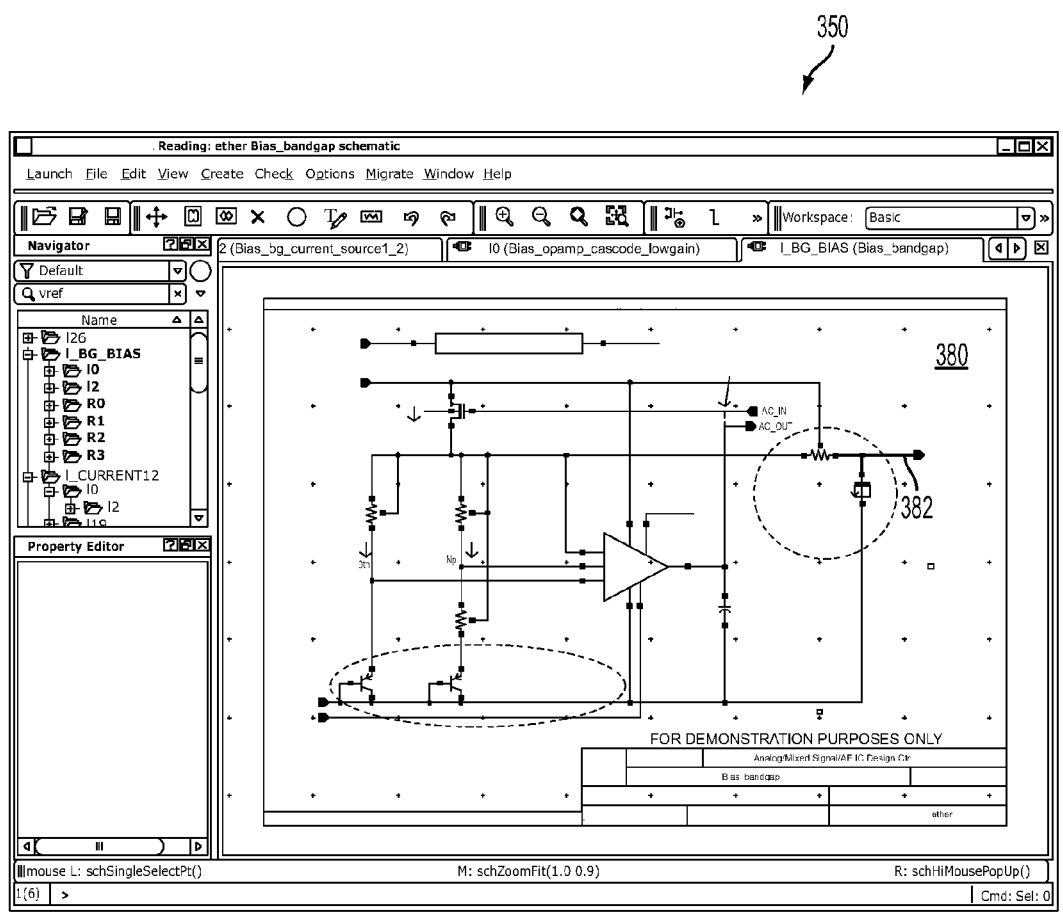
FIG. 25 is a diagrammatic illustration of a view of the interface of FIG. 18 after a user has navigated to a different portion of the design shown in the third preview image.

FIG. 25 shows a view 380 of the interface 350 after the user has navigated to a different portion of the design. The user has selected to navigate to the depicted hierarchal level shown in the preview image 370 of view 352 of FIG. 24 by clicking a button or inputting a different command while the cursor is within the preview image 370 to initiate the traversal. As a result, the view 380 is displayed, in which the main image 380 of the interface 350 depicts the selected hierarchical level. View 380 also highlights the probed (connected) signal or connection 382 which drives the originally-selected connection 354. In other embodiments, a different command can be provided to cause the hierarchical navigation operation to display view 380 as the main view. Furthermore, any preview image of FIGS. 18-25 can be similarly selected by the user to immediately navigate to the portion of the design depicted by that preview image such that the depicted view is the main view of the interface 350.

Thus, using the preview images of the present inventions, the user has essentially performed a single navigation (e.g., the main view of interface 350 changed only once) to get from the original probed input pin 354 of FIG. 18 to the circuitry that drives the pin 354 as shown in FIG. 25. Some embodiments can also allow the user to set preferences to display the new hierarchical level (navigated to) in a separate window, tab, or area of the display.

The preview images of the present inventions can also be used in a similar procedure to traverse the design hierarchy in the opposite direction to that shown in FIGS. 18-25, to follow receivers of a selected signal and connection in the design. For example, if the user notices that the bandgap voltage signal 382 of view 380 is not at the exact voltage desired or otherwise deviates from desired characteristics, the user may then be interested in other parts of the design that may be affected by this signal. In previous software applications, a probe selector would be added to the signal 382, and several navigation operations would be performed to view what components are connected to or being driven by the signal elsewhere in the design hierarchy. Each such navigation operation is a disjoint operation that can cause the user to lose context in the design.

Thus, the present invention allows a symmetrical navigation procedure to the procedure shown in FIGS. 18-25, to allow the user to follow receivers of a signal or "downstream" connections (in context of a signal) to a selected connection, e.g. look for instances which have input pins being driven by the selected signal. In some embodiments, the probe indicators used in the preview images can be marked in a different way when following receivers of a signal, as compared to the probe indicators shown in FIGS. 18-25 which were used in tracing drivers of a signal. For example, the probe indicators can be displayed in a different color for each type of operation, and/or can be displayed in a different orientation. In some embodiments, the orientation of the probe indicators has no hierarchical or other design significance, e.g., probe indicators can be oriented in a way simply to best fit their corresponding preview images on the display screen.

Figure 26:
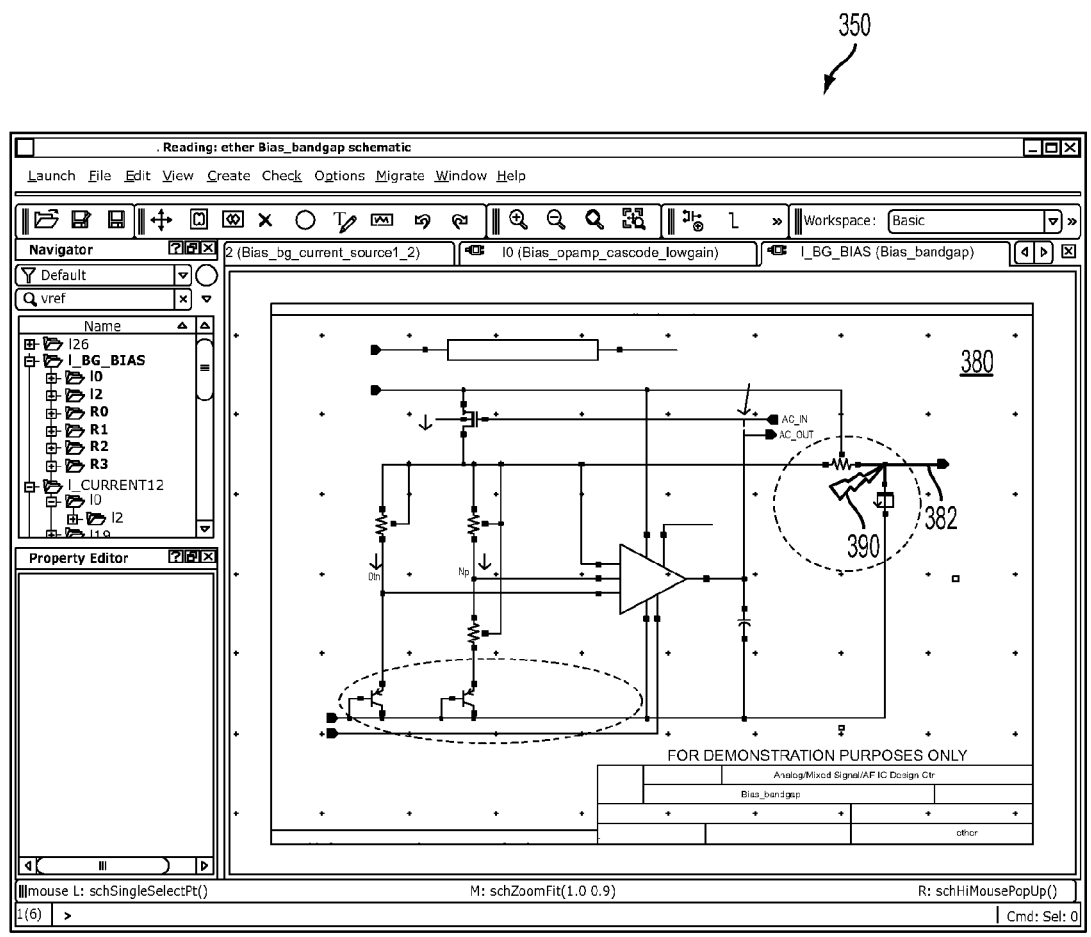
FIG. 26 is a diagrammatic illustration of a view of the interface of FIG. 18 after a user has selected a connection to follow the signal on that connection to components of the design that receive that signal.

FIG. 26 shows view 380 of interface 350 in which the user has selected the connection 382 to follow the signal on that connection to components of the design that receive that signal. As shown, the user places a probe cursor 390 to point to the desired connection. In the described example embodiment, the cursor 390 is shaped similarly to the probe indicators used in tracing driver signals as shown in FIGS. 18-25, but is a different color and displayed at a different orientation. Other embodiments can provide differently-shaped cursors and indicators. In some embodiments, once the user selects the desired connection with cursor 390 using a command (such as a mouse click), a static probe indicator that is no longer controlled by user pointing input is displayed at the selected connection, and the user can control a different displayed cursor (not shown).

Figure 27:
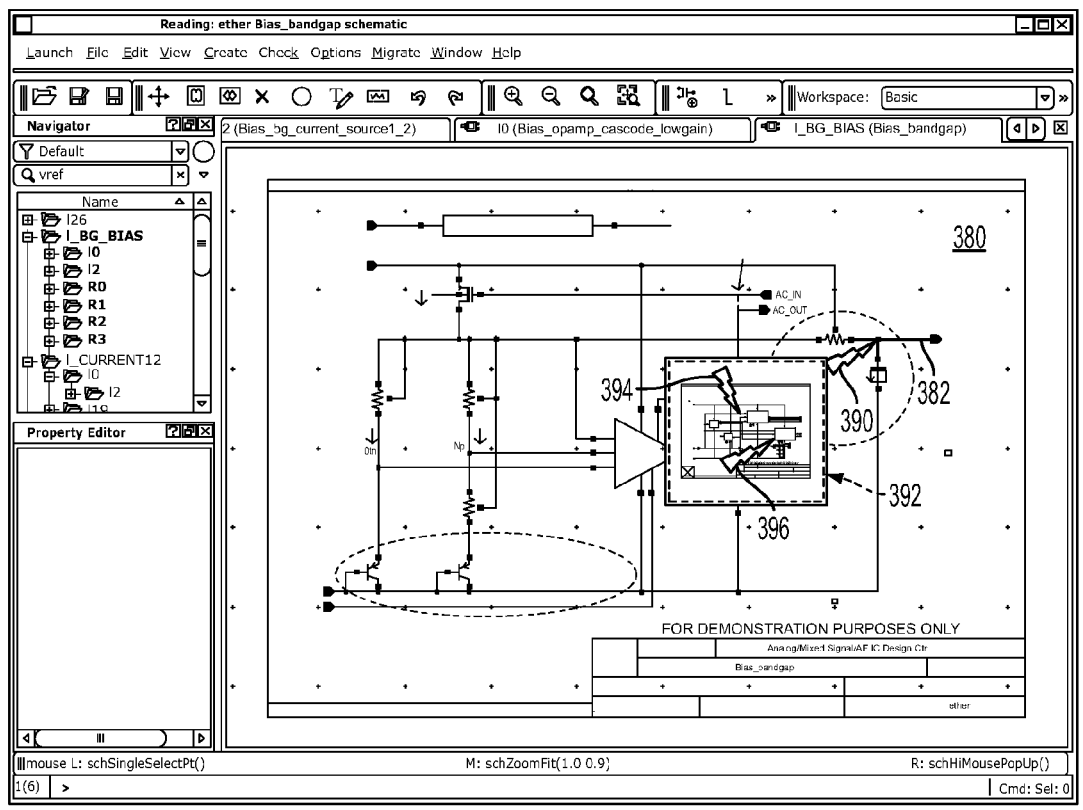
FIG. 27 is a diagrammatic illustration of a view of the interface of FIG. 18 after a user has selected a preview image to be displayed for a probe indicator.

In FIG. 27, the user has selected a preview image to be displayed for the probe indicator 390. In some embodiments, the preview image is displayed in response to user command(s), such as the user moving a cursor (not shown) to the non-pointing end of the probe indicator 390. In other embodiments, the preview image can be automatically displayed in response to the user selecting a signal or connection. In this example, preview image 392 is displayed next to (or near) the non-pointing end of the probe indicator 390, such that the probe indicator 390 provides a graphical association and visual linkage between preview image and its associated probed connection. The preview image 392 shows, in the next level up of the hierarchy, where this signal is being received and used, assisting the user in the visualization. In this example, there are multiple instances in the next level up which are driven by the selected signal, each of those instances marked with a probe indicator 394 and 396, respectively. This is an interactive command, and so the user has the option to select (e.g., point a cursor at the non-pointing end of) either of the indicators 394 or 396 to cause the associated next preview image to be displayed next to that indicator.

Figure 28:
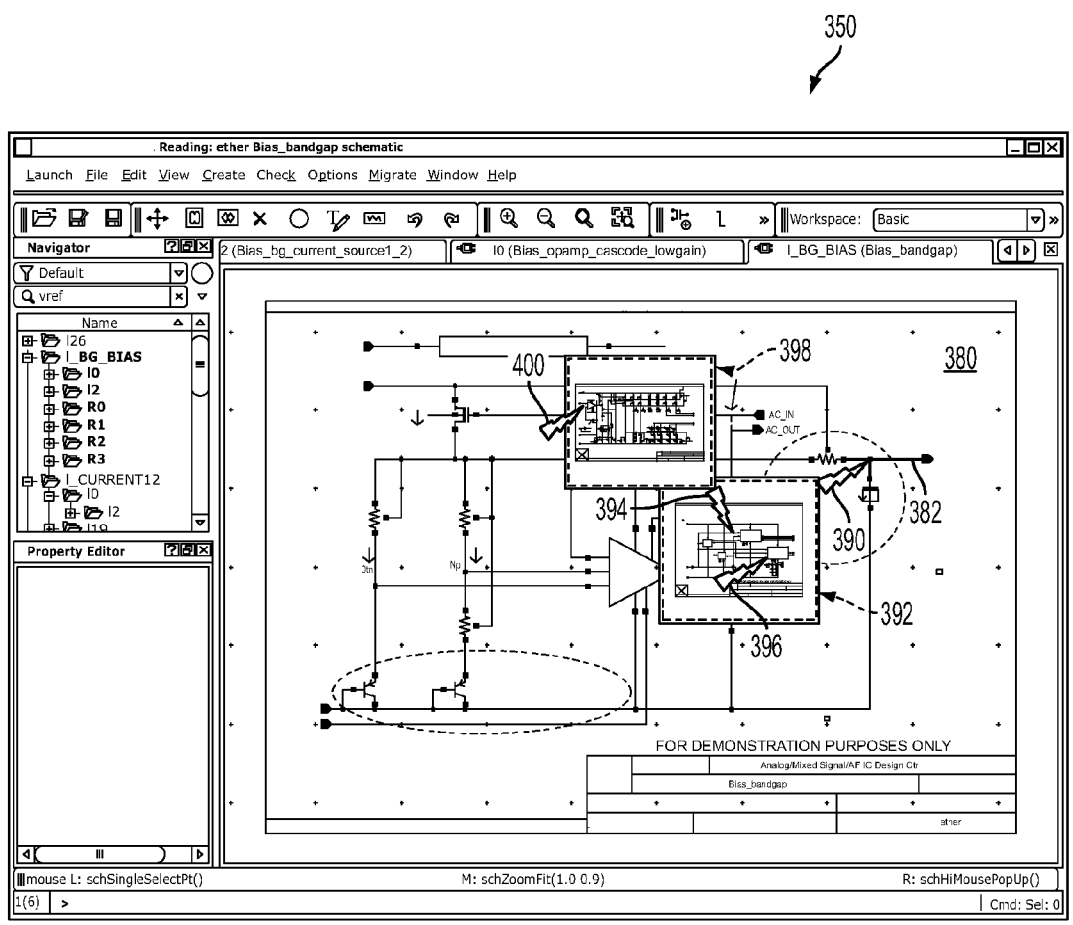
FIG. 28 is a diagrammatic illustration of a view of the interface of FIG. 18 after a user has selected the probe indicator displayed in the preview image to display a second preview image.

FIG. 28 shows view 380 in interface 350 after the user has selected the probe indicator 394 displayed in the preview image 392. For example, in some embodiments, in response to the user moving the cursor to the non-pointing end of indicator 394 (or the user otherwise selecting or providing an appropriate command to select indicator 394), preview image 398 is displayed at or near the non-pointing end of the probe indicator 394. Preview image 398 portrays the next lower hierarchical level of the instance pointed to by indicator 394 where the signal is being received. When the user moves the cursor into (or otherwise selects) the preview image 398, a probe indicator 400 is displayed, pointing to the connection where the selected signal is being received (consumed) at this next level down. In some other embodiments the indicator 394 can be displayed to be oriented downwards (if displayed features of the design allow space for this) to indicate a lower hierarchical level.

Figure 29:
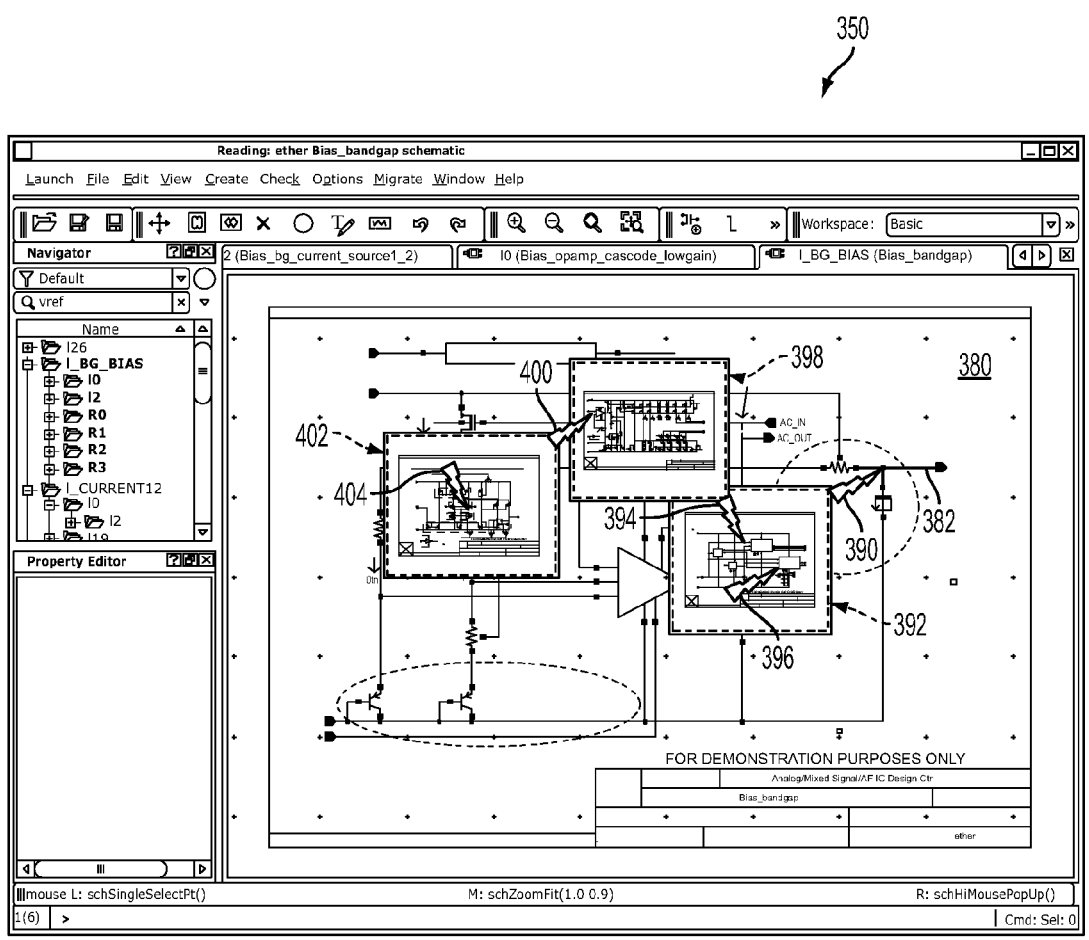
FIG. 29 is a diagrammatic illustration of a view of the interface of FIG. 18 after a user has selected the probe indicator displayed in the second preview image to display a third preview image.

FIG. 29 shows view 380 in interface 350 after the user has moved the cursor (or otherwise selected) the probe indicator 400, or otherwise provided a command, to display the preview image associated with the indicator 400. This causes a preview image 402 to be displayed, e.g., at or near the non-pointing end of the probe indicator 400. Preview image 402 portrays the next hierarchical level (lower level in this example) where the probed signal is being received. When the user moves the cursor into (or otherwise selects) the preview image 402, a probe indicator 404 is displayed, pointing to the connection where the selected signal is being received in this preview image. Since preview image 402 shows the last instance in the chain of components receiving the signal, no additional preview images will be displayed from probe indicator 400. The user can select the preview image 402 (or provide another command) to navigate to the portion of the design depicted in the preview image, so that the main view of the interface 350 displays that portion with the connection indicated by indicator 404 being highlighted or otherwise marked, similar to the view 301 including the highlighted connection 304 as shown in FIG. 14. As with previous embodiments, the user can select or command any of the displayed preview images to cause a navigation operation to the portion of the design depicted in the selected preview image.

In some embodiments, the user is able to use the cursor to select a location anywhere outside any of the preview images to cause all the preview images and probe indicators to be removed from the display. In some embodiments other commands can also be used to cause a similar result.

In still other embodiments, displayed features instead of (or in addition to) the orientation of the probe indicator can be used to indicate the direction of hierarchy of a preview image relative to a selected object or earlier preview image. For example, a background color of a preview image can indicate a direction of hierarchy of the design portion displayed by that image relative to the previous object/image, where one color indicates a higher level of hierarchy and a different color indicates a lower level of hierarchy. Different shapes or sizes of preview image and/or probe indicator can also be used to indicate direction of hierarchy of a particular preview image.

The preview image of the present inventions provides many advantages to a user viewing and manipulating an image in an editing interface. The preview images can provide an intuitive method for the user to traverse one or more levels of a hierarchy in a design. The number of required ascend or descend operations to different hierarchical levels is significantly reduced, allowing an increase in productivity and efficiency in image design and editing. Furthermore, users can work from a higher hierarchical level and plan the design, can use the preview images to view the design at a more detailed level to determine which level to descend to, and then can quickly return to a higher hierarchical level for more viewing or planning by selecting one or more ascend icons. Thus, efficient viewing of multiple different hierarchical levels are provided in one interface and model.

In addition, the incorporation of both high and low hierarchical level in the single view of the main image allows the user to avoid confusion and "getting lost" during abrupt ascend and descend operations to different hierarchical levels as required by prior interfaces, and thus the user can avoid the additional ascend and descend operations needed to re-orient oneself with a spatial context. Furthermore, the user is interactively guided through the hierarchy without requiring intermediate navigation steps to be performed, where only the beginning view and destination view need be displayed in the main view of the interface, once the user finally decided to select a preview image for navigation. Some embodiments allow use of connections between different portions of the design, so that probe indicators can indicate connections and signals that are of interest, and the user can be guided through the hierarchy to precisely the connected features of interest in the design.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a preview image for an electrical circuit design using a computer system, the method comprising:
displaying a main image depicting a first portion of the circuit design at a hierarchical level on a display device, wherein the main image includes a first connection that routes an electrical signal;
in response to a probe selection of the first connection, displaying a preview image smaller than the main image depicting a second portion of the circuit design at a different hierarchical level on the display device, wherein the preview image includes a second connection that routes the electrical signal and is electrically connected to the first connection;
in response to a probe selection of the second connection, displaying a second preview image smaller than the main image depicting a third portion of the circuit design at another different hierarchical level on the display device, wherein the second preview image includes a third connection that routes the electrical signal and is electrically connected to both the first and the second connections; and
in response to any of the preview image and the second preview image being selected, displaying any of the second portion and the third portion of the circuit design as the main image on the display device.

2. The method of claim 1 wherein the preview image and the main image are both displayed within a predefined viewing area of the display device, the predefined viewing area being bounded by a screen size of a screen of the display device.

3. The method of claim 1 wherein the preview image is displayed to at least partially overlap the main image.

4. The method of claim 1 wherein the preview image is associated with a circuit schematic symbol displayed in the main image, the circuit schematic symbol being an abstracted representation of the second portion of the circuit design, wherein the second portion is a sub-circuit of the circuit design, and wherein the sub-circuit is represented by the circuit schematic symbol such that details of the sub-circuit are not displayed in the main image.

5. The method of claim 1 wherein displaying the preview image includes displaying the preview image in a position on the display screen to indicate a hierarchical direction of the different hierarchical level portrayed by the preview image relative to the hierarchical level of the main image, the hierarchical direction selected from multiple available directions including higher and lower hierarchical directions.

6. The method of claim 1 wherein the preview image includes one or more displayed hotspots receptive to user selection, wherein the one or more hotspots are each visually indicated to be selectable by a user, such that in response to one of the hotspots being selected, the second preview image is displayed.

7. The method of claim 6 wherein the preview image portrays the second portion of the design at a lower hierarchical level of the circuit design than the first portion of the circuit design, and wherein the second preview image portrays the third portion of the circuit design at a lower hierarchical level of the circuit design than the second portion of the circuit design.

8. The method of claim 1 further comprising;
displaying an ascend icon on the display device, wherein in response to the ascend icon being selected by a user, causing a display of an associated preview image portraying a third portion of the circuit design at a higher hierarchical level of the circuit design than the first portion of the circuit design, wherein the third portion of the circuit design displays the first portion of the circuit design as an abstracted circuit symbol that does not show all the details of the first portion in the main image, and wherein the third portion of the circuit design includes one or more components of a circuit not included in the first portion of the circuit design and electrically connected to the first portion of the circuit design.

9. The method of claim 8 wherein the associated preview image includes one or more displayed hotspots receptive to user selection, wherein in response to one of the hotspots being selected by the user, causing a display of a different preview image on the display device, the different preview image being smaller than the main image and portraying a fourth portion of the circuit design at a lower hierarchical level of the circuit design than the third portion of the circuit design, and wherein in response to receiving a selection of the different preview image, causing a display of the fourth portion of the circuit design as the main image on the display device.

10. The method of claim 8 wherein in response to input from the user, causing a display of a second ascend icon on the display device, the second ascend icon associated with the associated preview image, wherein in response to the second ascend icon being selected by the user, causing a display of a different preview image smaller than the main image on the display device, the different preview image portraying a fourth portion of the circuit design at a higher hierarchical level of the circuit design than the third portion of the circuit design, and wherein in response to receiving a selection of the different preview image, causing a display of the fourth portion of the circuit design as the main image on the display device.

11. The method of claim 1 wherein at least one line is displayed between the preview image and a location in the main image, wherein the at least one line indicates an association between the location in the main image and the preview image.

12. The method of claim 1 further comprising:
displaying at least one additional preview image smaller than the main image, the additional preview image depicting a different version of the second portion of the circuit design at the same hierarchical level as the second portion of the circuit design in the preview image, wherein in response to receiving a selection of the additional preview image, causing a display of the different version of the second portion of the circuit design as the main image on the display device.

13. The method of claim 1 wherein the second connection receives the electrical signal after the first connection receives the electrical signal in a flow path of the electrical signal.

14. The method of claim 1 wherein the second connection receives the electrical signal before the first connection receives the electrical signal in a flow path of the electrical signal.

15. The method of claim 1 further comprising:
displaying a probe indicator in the preview image, the probe indicator being separate from the second connection and pointing to the second connection in the second portion of the circuit design, wherein the probe indicator provides a graphical association between the preview image and a selected first connection in the main view.

16. The method of claim 15 wherein the probe indicator is displayed in a manner to indicate the direction of hierarchy of the second preview image relative to the preview image, or the direction of hierarchy of the preview image relative to the selected first connection.

17. A non-transitory computer program product comprising a non-transitory computer readable medium including program instructions to be implemented by a computer and for displaying a preview image for an electrical circuit design using a computer system, the program instructions for:
 displaying a main image depicting a first portion of the circuit design at a hierarchical level on a display device, wherein the main image includes a first connection that routes an electrical signal;
 in response to a probe selection of the first connection, displaying a preview image smaller than the main image depicting a second portion of the circuit design at a different hierarchical level on the display device, wherein the preview image includes a second connection that routes the electrical signal and is electrically connected to the first connection;
 in response to a probe selection of the second connection, displaying a second preview image smaller than the main image depicting a third portion of the circuit design at another different hierarchical level on the display device, wherein the second preview image includes a third connection that routes the electrical signal and is electrically connected to both the first and the second connections; and
 in response to any of the preview image and the second preview image being selected, displaying any of the second portion and the third portion of the circuit design as the main image on the display device.

18. The computer program product of claim 17 wherein the preview image is associated with a circuit schematic symbol displayed in the main image, the circuit schematic symbol being an abstracted representation of the second portion of the circuit design, wherein the second portion is a sub-circuit of the circuit design, and wherein the sub-circuit is represented by the circuit schematic symbol such that details of the sub-circuit are not displayed in the main image.

19. The computer program product of claim 17 wherein the preview image includes one or more displayed hotspots receptive to user selection, wherein the one or more hotspots are each visually indicated to be selectable by a user, such that in response to one of the hotspots being selected, the second preview image is displayed.

20. The computer program product of claim 19 wherein the preview image portrays the second portion of the design at a lower hierarchical level of the circuit design than the first portion of the circuit design, and wherein the second preview image portrays the third portion of the circuit design at a lower hierarchical level of the circuit design than the second portion of the circuit design.

21. The computer program product of claim 17 further comprising:
 displaying an ascend icon on the display device, wherein in response to the ascend icon being selected by a user, causing a display of an associated preview image portraying a third portion of the circuit design at a higher hierarchical level of the circuit design than the first portion of the circuit design, wherein the third portion of the circuit design displays the first portion of the circuit design as an abstracted circuit symbol that does not show all the details of the first portion in the main image, and wherein the third portion of the circuit design includes one or more components of a circuit not included in the first portion of the circuit design and electrically connected to the first portion of the circuit design.

22. The computer program product of claim 21 wherein in response to input from the user, causing a display of a second ascend icon on the display device, the second ascend icon associated with the associated preview image, wherein in response to the second ascend icon being selected by the user, causing a display of a different preview image smaller than the main image on the display device, the different preview image portraying a fourth portion of the circuit design at a higher hierarchical level of the circuit design than the third portion of the circuit design, and wherein in response to receiving a selection of the different preview image, causing a display of the fourth portion of the circuit design as the main image on the display device.

23. The computer program product of claim 17 further comprising;
 displaying a probe indicator in the preview image, the probe indicator being separate from the second connection and pointing to the second connection in the second portion of the circuit design, wherein the probe indicator provides a graphical association between the preview image and a selected first object in the main view.

24. A system for displaying a preview image for an electrical circuit design using a computer system, the system comprising:
 a memory; and
 a processor in communication with the memory, the processor:
  displaying a main image depicting a first portion of the circuit design at a hierarchical level on a display device, wherein the main image includes a first connection that routes an electrical signal;
  in response to a probe selection of the first connection, displaying a preview image smaller than the main image depicting a second portion of the circuit design at a different hierarchical level on the display device, wherein the preview image includes a second connection that routes the electrical signal and is electrically connected to the first connection;
 in response to a probe selection of the second connection, displaying a second preview image smaller than the main image depicting a third portion of the circuit design at another different hierarchical level on the display device, wherein the second preview image includes a third connection that routes the electrical signal and is electrically connected to both the first and the second connections; and
 in response to any of the preview image and the second preview image being selected, displaying any of the second portion and the third portion of the circuit design as the main image on the display device.

25. The system of claim 24 wherein the preview image is associated with a circuit schematic symbol displayed in the main image, the circuit schematic symbol being an abstracted representation of the second portion of the circuit design, wherein the second portion is a sub-circuit of the circuit design, and wherein the sub-circuit is represented by the circuit schematic symbol such that details of the sub-circuit are not displayed in the main image.

26. The system of claim 24 wherein the preview image includes one or more displayed hotspots receptive to user selection, such that in response to one of the hotspots being selected, the processor causes a second preview image to be displayed.

27. The system of claim 24 wherein the processor further displays an ascend icon on the display device, wherein in response to the ascend icon being selected by a user, the processor causes a display of an associated preview image portraying a third portion of the circuit design at a higher hierarchical level of the circuit design than the first portion of the circuit design, wherein the third portion of the design displays the first portion of the circuit design as an abstracted circuit symbol that does not show all the details of the first portion in the main image, and wherein the third portion of the circuit design includes one or more components of a circuit not included in the first portion of the design and electrically connected to the first portion of the circuit design.

\* \* \* \* \*